US005163104A

United States Patent [19]

Ghosh et al.

[11] Patent Number: 5,163,104

[45] Date of Patent: Nov. 10, 1992

[54] DIGITAL IMAGE PROCESSING TECHNIQUE INCLUDING IMPROVED GRAY SCALE COMPRESSION

[75] Inventors: Atish Ghosh, Dupage County; Girish Rai, Cook County, both of Ill.

[73] Assignee: TransTechnology Corporation, Sherman Oaks, Calif.

[21] Appl. No.: 159,665

[22] Filed: Feb. 24, 1988

[51] Int. Cl.[5] .................................... G06K 9/00

[52] U.S. Cl. .................................... 382/56; 358/261.3

[58] Field of Search .................... 382/56, 41, 50; 358/166, 260, 261.3

[56] References Cited

U.S. PATENT DOCUMENTS

| | | | |
|---|---|---|---|
| 4,205,341 | 5/1980 | Mitsuya et al. | 358/260 |
| 4,205,780 | 6/1980 | Burns et al. | 382/42 |
| 4,319,267 | 3/1982 | Mitsuya et al. | 358/260 |
| 4,494,141 | 1/1985 | Altekruse | 382/56 |
| 4,510,619 | 4/1985 | Ceburn et al. | 382/57 |
| 4,578,713 | 3/1986 | Tsao et al. | 382/50 |
| 4,692,806 | 9/1987 | Anderson et al. | 382/56 |
| 4,776,030 | 10/1988 | Tzou | 382/56 |
| 4,831,659 | 5/1989 | Miyaoka et al. | 382/56 |

OTHER PUBLICATIONS

Gonzalez and Wintz, *Digital Image Processing*, Chapter 6, "Image Encoding" pp. 228-319, 1977, Addison-Wesley Publishing Comp. Inc.

*Primary Examiner*—David K. Moore

*Assistant Examiner*—Yon Jung

*Attorney, Agent, or Firm*—Neuman, Williams, Anderson & Olson

[57] ABSTRACT

An improved technique for gray scale compression of document image data is disclosed. The method comprises evaluating subportions of an image array as to relative levels of sameness and attempting to create sub-arrays having the same pixel value. Successively smaller sub-arrays are evaluated as to gray scale sameness unti $2\times1$ pixel arrays are encountered. At that time a code unique to each possible $2\times1$ pixel arrangement is stored. A high speed, real-time compression implementation is facilitated through described hardware. Document images are subdivided into 8 pixel by 512 pixel slices. As one document slice is stored in a first buffer RAM, a previously stored slice is compressed. As the pixel information is stored, tests are performed for $8\times8$ and $4\times4$ array sameness and one bit data stored according to the results of those tests. High speed compression is facilitated by querying the stored data as to the $8\times8$ and the $4\times4$ array sameness prior to further processing. Pixel gray scale information is provided as input to look up tables which provide coded information as to gray scale value in a variable length coded output. Status of $8\times8$ and $4\times4$ blocks as to sameness controls sequencing of the input to the look up tables. The microprocessor controller handles no pixel data but merely processes coded data for placement on appropriate bus and storage in an appropriate memory medium.

22 Claims, 17 Drawing Sheets

FIG-2-
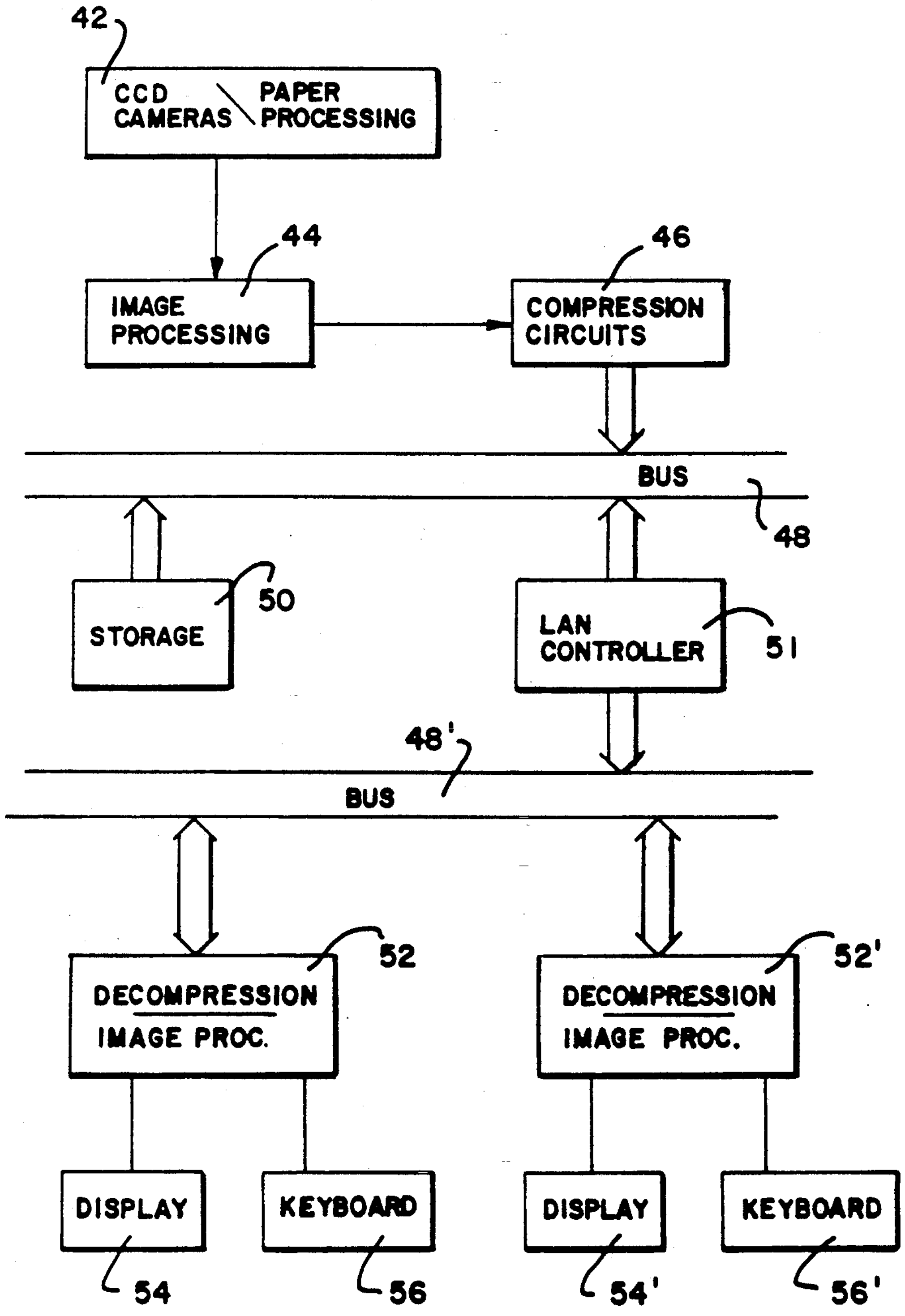

FIG-3-

MARY & DON DOE  
4 SEASONS DRIVE  
HOMETOWN, USA

NO. 4100

64

$\frac{9-10}{1234}$

68

*Jan. 1* 19 *88*

Pay to the order of  QQQ LIGHT & POWER CO.   # 25.$\frac{25}{}$

*Twenty Five and* $\frac{25}{100}$ ————————— Dollars

SPY BANK  
007 BOND AVE.  
FANTASYLAND, USA

70

72

*Don Doe*

QQQ LIGHT & POWER CO.  
111 DOWNTOWN DRIVE  
HOMETOWN, USA   00000

Amount Due  
25.25

Account No.   66  
999-333-111

MARY & DON DOE  
4 SEASONS DRIVE  
HOMETOWN, USA.   00000

25.25  
999 333 111

62

| | | | | | | | |
|---|---|---|---|---|---|---|---|
| 2 | 2 | 2 | 2 | 7 | 7 | 8 | 8 |
| 2 | 2 | 2 | 2 | 7 | 7 | 8 | 8 |
| 2 | 2 | 2 | 2 | 3 | 3 | 6 | 6 |
| 2 | 2 | 2 | 2 | 3 | 5 | 5 | 11 |
| 3 | 3 | 3 | 3 | 4 | 4 | 4 | 4 |
| 3 | 3 | 3 | 3 | 4 | 4 | 4 | 4 |
| 3 | 3 | 3 | 3 | 4 | 4 | 4 | 4 |
| 3 | 3 | 3 | 3 | 4 | 4 | 4 | 4 |

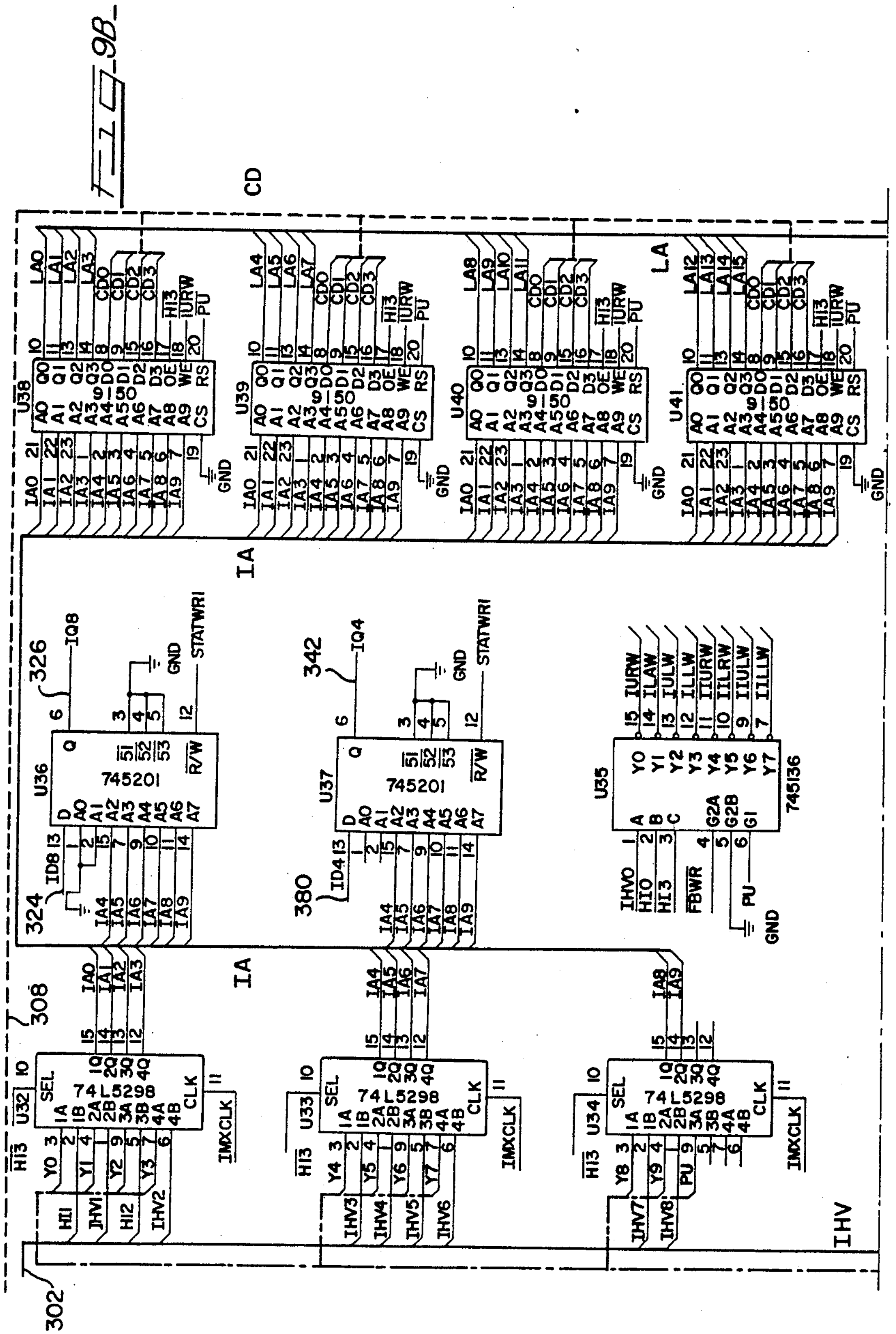
FIG_9B
CD
LA
IA
IHV
U38
U39
U40
U41
U36
U37
U35
U32
U33
U34
74S201
74S136
74LS298
STATWRI
GND
IMXCLK
326
342
324
380
308
302

DIGITAL IMAGE PROCESSING TECHNIQUE INCLUDING IMPROVED GRAY SCALE COMPRESSION

The present invention generally relates to digital image processing in the document handling art. More particularly, the present invention provides an improved technique, including novel hardware implementation, for real-time gray-scale image compression. Specific use of the technique of the present invention may be found in large document handling and information processing applications, including remittance processing systems.

Remittance and document processing systems are well known in the art. For example, LeBrun, "Document Processing System", U.S. Pat. No. 4,510,619, issued Apr. 9, 1985, and Burns et al., "Document Processing System and Method", U.S. Pat. No. 4,205,780, issued Jun. 3, 1980, describe two such systems. LeBrun describes a document processing system including a digital image capture system as well as a transport system, character recognition, document encoding, endorsers, audit trail printers and in-line microfilm recording systems. Video terminals and printers provide images of the processed documents. LeBrun includes a compression technique with associated hardware for implementation in order to store the large quantities of data associated with each document and the multitude of processed documents. However, the system requires a bitonal sorting or thresholding of the raw image data prior to compression and storage of the image data. This can result in a dramatic decrease in the content and readability of the reproduced and displayed image when the data is decompressed for display.

Likewise, Burns describes a document processing system having a video camera and TV monitors. A document transport system passes documents by a data reader and video camera. Machine readable data and the entire image are stored; the images are stored in either analog or digital fashion. The document image may then be displayed with appropriate data on operator monitors. Burns has no provision for compression of the raw video image data. As such, the number of documents or transactions which can be stored is limited by the available memory space.

Generally, the prior art suffers from the drawbacks illustrated by the systems described in LeBrun and Burns. Users of such systems have typically been faced with the unsatisfactory choice of either having the displayed image quality dramatically decreased as a result of bitonal thresholding of the raw image data to accommodate compression/storage of large quantities of image data or paying the high cost of including extremely large quantities of memory in the system in order to store the raw image data in an uncompressed state.

Accordingly, the present invention has as its principal object the provision of a system which generally overcomes the deficiencies of the prior art.

A more particular object of the present invention is to provide a system which allows storage of large quantities of image data without an undue decrease in the reproduced, displayed image quality.

It is a further object of the present invention to provide a hardware implementation of an improved gray scale compression technique for storing large quantities of digital data in relatively small memory space.

It is still a further object of the present invention to provide a hardware implementation which maximizes speed at which raw image data may be compressed so as to provide real time storage of digital image data in extremely high speed document processing applications.

It is yet a further object of the present invention to provide real time gray scale compression of digital image data in extremely high speed document processing systems through optimization of hardware electronic components.

It is yet still a further object of the present invention to provide real time gray scale image data compression in an extremely high speed application while optimizing system cost.

Generally, the present invention provides an improved means and method for gray scale compression of document images, particularly in a high speed document processing environment. The method of the present invention involves an assessment of successively smaller blocks of the document image in order to identify as large a block of pixels as possible all having a single gray scale value. As blocks of pixels having a single gray scale value are identified, a code is stored indicative of the sameness of the pixels and of the gray scale value that that block of pixels shares. When a given size block does not contain pixels all having the same gray scale value, that block of pixels is subdivided into smaller blocks. The same sameness test is applied to the smaller blocks and whenever a block is identified having pixels all sharing the same gray scale value, a code is stored indicative of the sameness and of the shared gray scale value. Whenever a block must be subdivided because it does not contain pixels all sharing a single gray scale value, a different code is stored. Once the document has been broken down into a 2×2 pixel block, a test is made to see if the difference between the highest pixel value and the lowest pixel value within the 2×2 block is less than a predetermined threshhold. If the difference is less than or equal to the threshhold, the whole block is forced to assume the value of the most popular pixel value with the block, and the block is encoded with a code indicative of the sameness and of the most popular pixel value. Once the document image has been subdivided down to a base level of blocks, for example, down to a 2×1 pixel block the threshold technique is applied again. If the threshold has been exceeded then a distinct code is stored indicative of the gray scale value for the pixels in that base block. In one embodiment, this final code stores a first portion indicative of the gray scale value of a first pixel in a block and then stores a subsequent portion of a code indicative of the difference for each subsequent pixel in the block from that original gray scale value.

The means of the present invention provide for an optimal, high speed processing of the gray scale compression technique in accordance with one embodiment of the present method. Means are provided for identification of separate portions of a document image. Means are further provided for subdividing portions of the document image into smaller blocks and storing code representative of the gray scale values for each block, in successively smaller blocks, until the base block level is reached. In a particular hardware implementation, parallel buffer networks are used to facilitate rapid compression. As a first buffer holds one portion of the document image for compression under the control of a processor, a second buffer network is loaded with another portion of the image to be compressed. Information as to the sameness of various size blocks within each image portion is also stored in the respective buffer networks. In operation, a microprocessor selectively addresses the pixel information stored in the buffers. The addressing by the microprocessor is controlled by separately stored information as to the sameness of various sized blocks within each image portion. Multiplexer circuitry controls switching between the buffer networks. A lookup table is interposed between the stored image data and the processor means to provide the appropriate code based upon the input pixel information. These and other additional novel features of the present invention are set forth with particularity below.

BRIEF DESCRIPTION OF THE FIGURES

The appended claims set forth the novel features of the present invention. However, the invention, as well as further and additional objects and advantages thereof, may be best understood by reference to the following detailed description of a preferred embodiment taken in conjunction with the accompanying drawings, in which like reference characters identify like elements, and of which:

DETAILED DESCRIPTION OF A PREFERRED EMBODIMENT

Generally, the present invention provides an improved hardware implementation for gray scale compression of digital visual images on a real time basis. A particular application of the present invention may be found in document handling systems, particularly in extremely high speed systems, in which rapid storage of image data for subsequent, accurate retrieval by online operators without undue memory requirements is a necessity.

Figure 1:
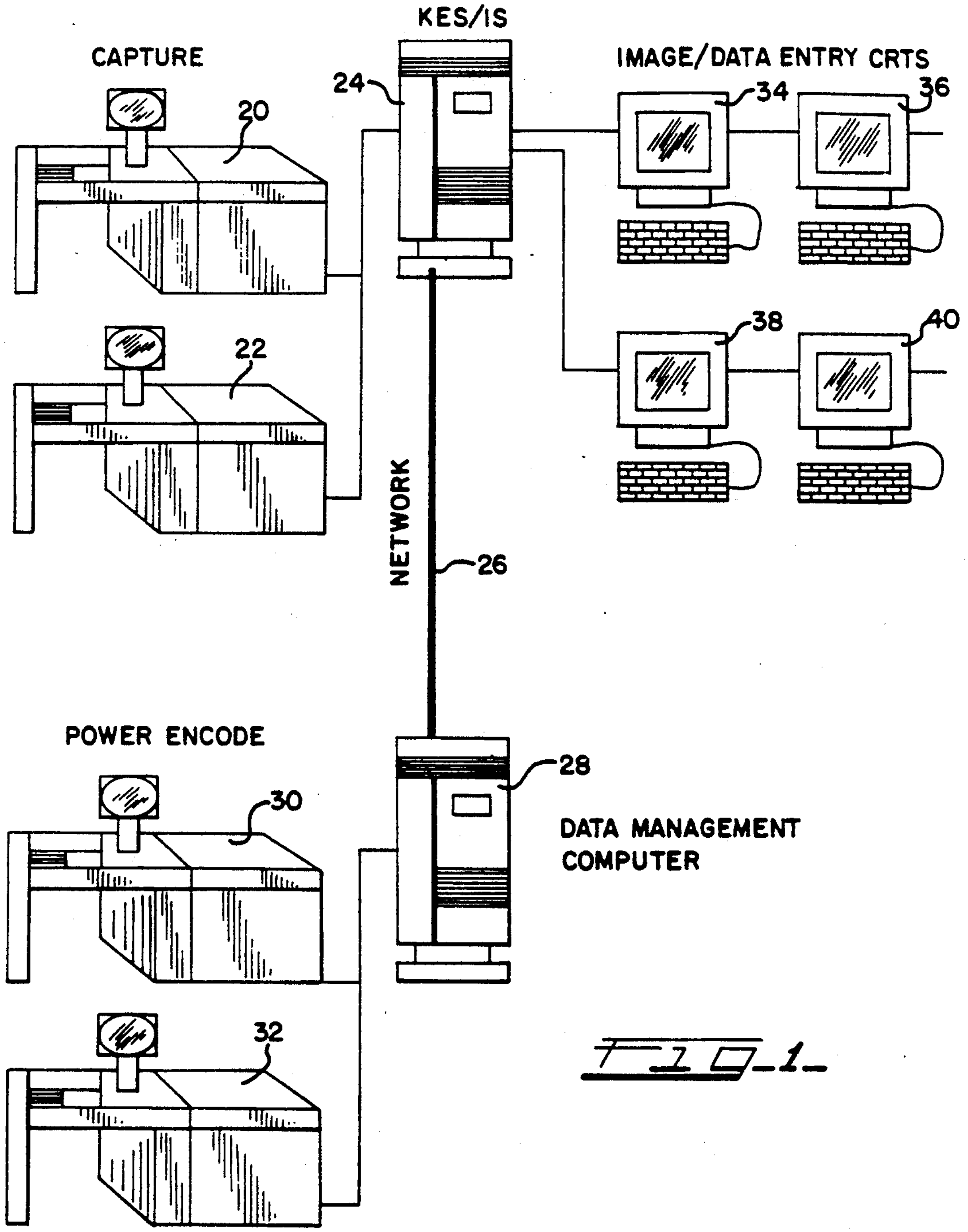
FIG. 1 generally illustrates a document processing system in which a preferred embodiment of the present invention may be readily implemented.

Referring now to FIG. 1, therein is shown one such high speed document processing system. Generally, capture stations 20 and 22 include high speed document processing and sorting means, such as the kind well known in the prior art. In a preferred embodiment, capture stations 20 and 22 also include high resolution video camera equipment for recording video images of each document as it passes a particular imaging station within the capture stations. In the preferred embodiment, the video camera comprises a Fairchild-manufactured camera providing 512 pixel line digital video image data. Capture stations 20 and 22 are controlled through a key entry/image server computer 24. The image server computer 24 is connected via a network 26 to a data management computer 28. Also connected to the data management computer 28 are power encode stations 30 and 32. At the power encode stations 30 and 32, additional data may be encoded on documents as they are processed. Information entered into the system at the capture stations 20 and 22 is stored in the data management computer 28. In the preferred embodiment, storage is accomplished with the gray scale video image data being compressed and associated digital information stored in its natural format.

In the typical document processing system, such as that shown in FIG. 1, hands-on access to each document entry is desired at operator work stations. Although it is desired that initial entry of the data into the system be accomplished in an extremely high speed fashion to facilitate batch processing of documents, display at the operator work stations may be accomplished in a more feasible, slower rate. As shown in FIG. 1, operator work stations 34, 36, 38 and 40 are connected to the image server computer 24. Thus, the image server computer 24 controls the operation of the operator work stations 34–40. At these work stations, the desired document display is implemented and the operators may enter appropriate data in response to the visual prompt of the displayed images. It will be appreciated that the number of capture, encode and operator stations in any particular application will vary in accordance with needs of a particular user. Accordingly, the system shown in FIG. 1 should be recognized as being for illustrative purposes only and not intended to limit application of the present invention to the system shown therein. Likewise, the system illustrated in FIG. 1 should be recognized as being generally applicable to various areas of use. For example, the system may be implemented in a remittance processing network, in a mail sorting environment, in a white mail, non-paper transfer network, in subscription fulfillment applications and various other applications involving the high speed sorting classification and storage of document images.

Figure 9A:
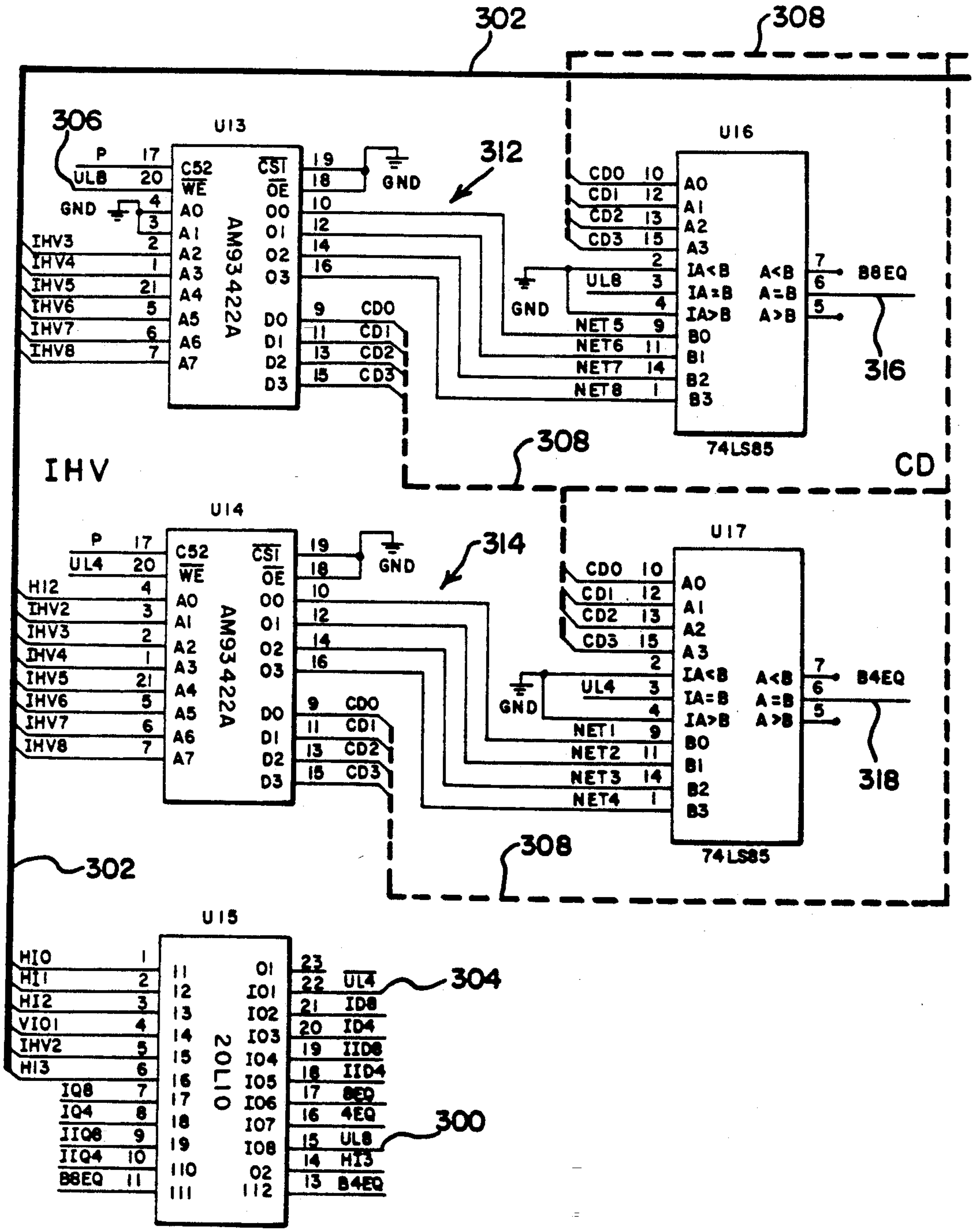
FIGS. 9A, 9B, and 9C together represent a preferred embodiment of a hardware implementation of a method for gray scale compression in accordance with the present invention.
Figure 9B:
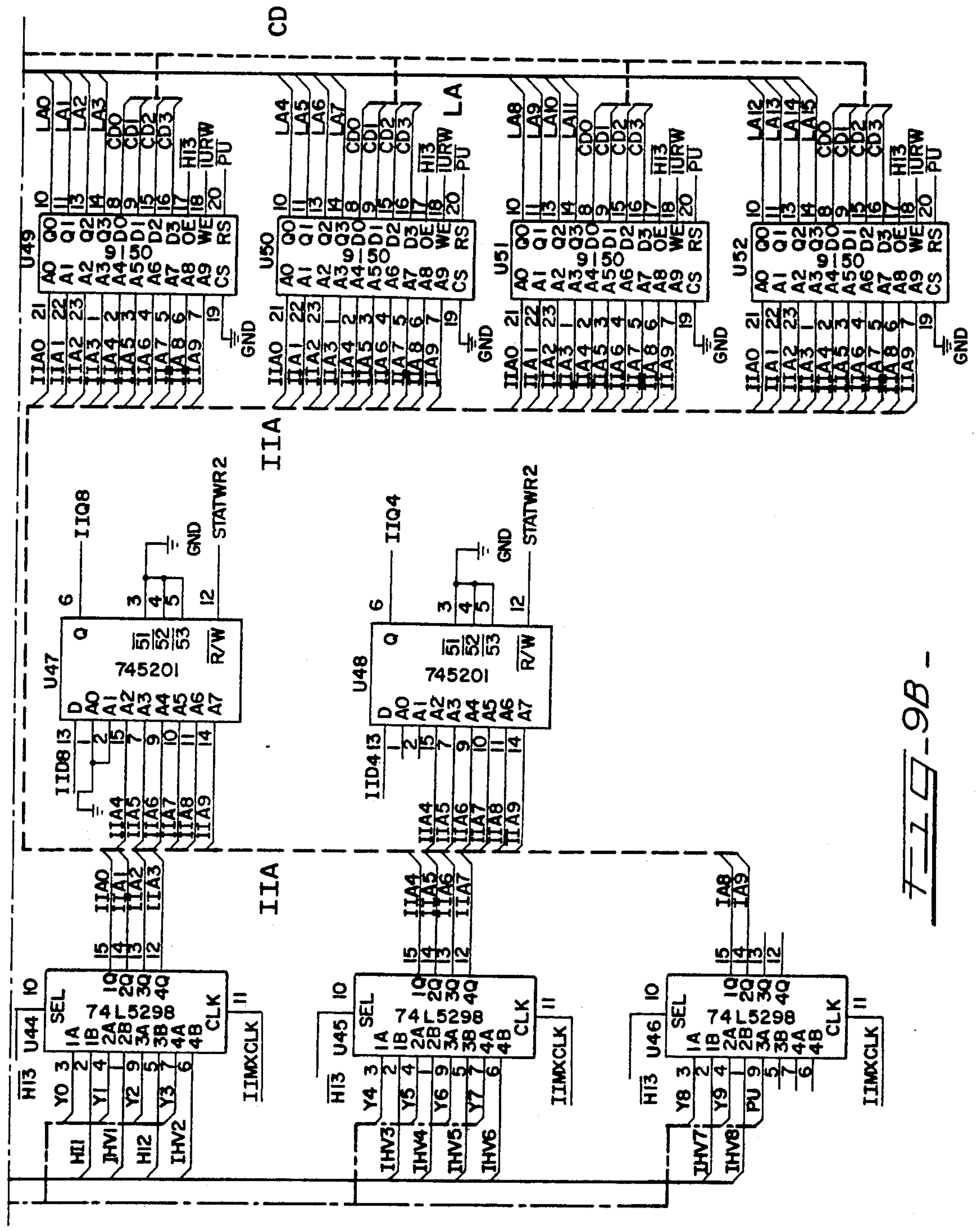
Figures 1, 9B:
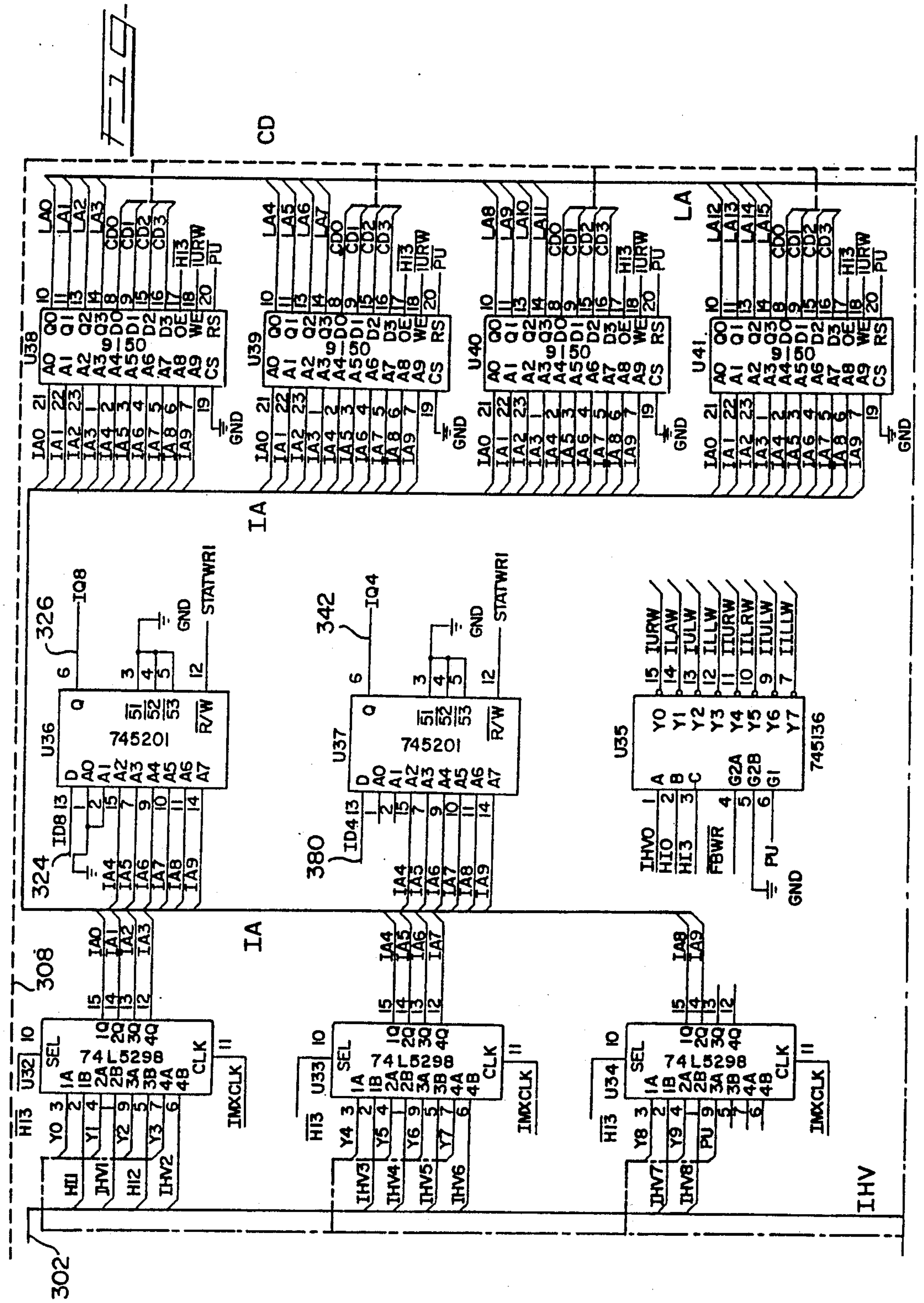
Figures 2, 9B:
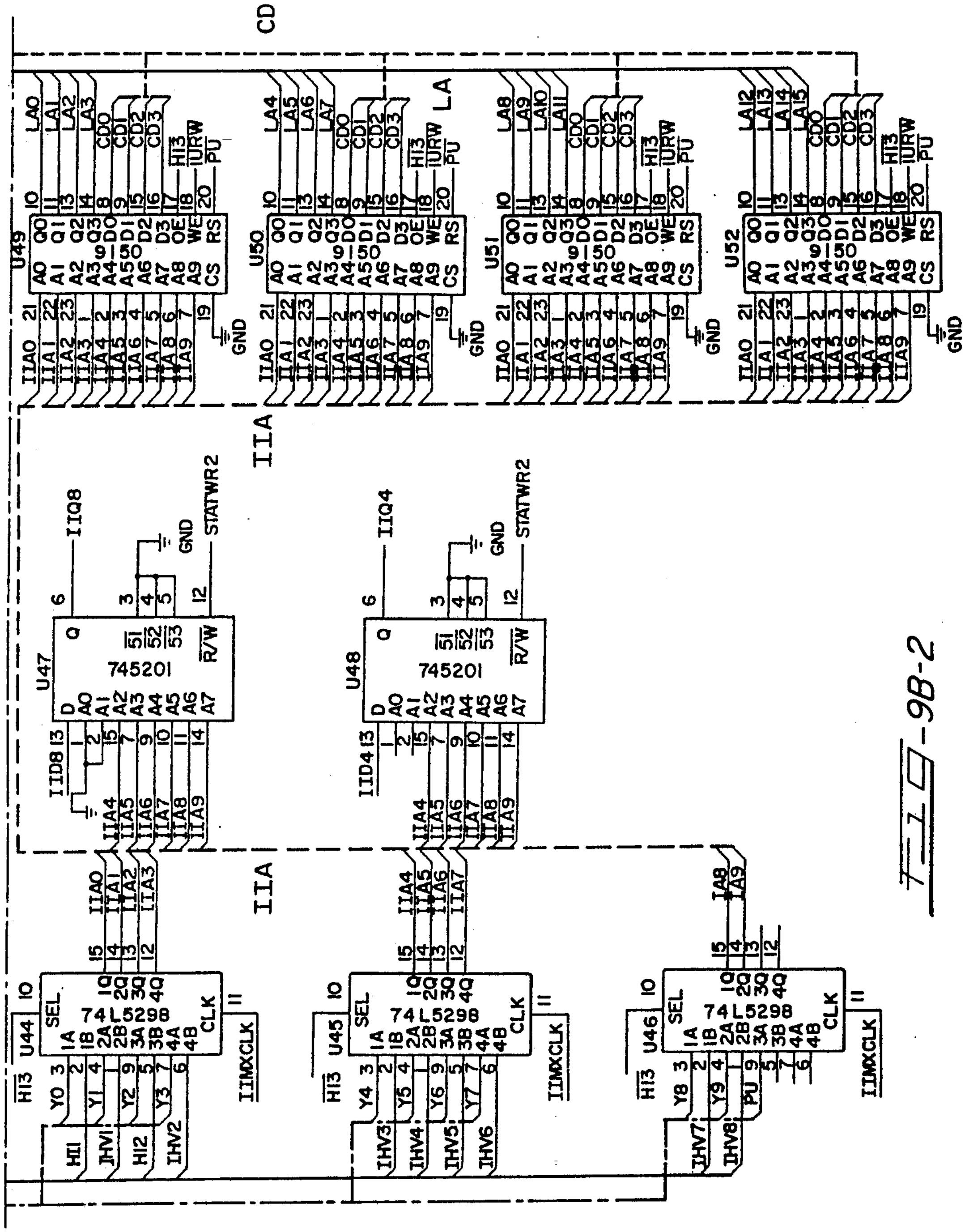
FIG. 2 illustrates a block diagram representation of a document processing system such as the high speed system of FIG. 1.

Referring now to FIG. 2, therein is shown a block diagram of the system illustrated generally in FIG. 1.

As mentioned previously, in a preferred embodiment, each document is scanned by a CCD camera 42 in association with the document or paper processing. The digital image signals are then processed from the raw state by image processing circuitry 44. The processed raw digital images are then supplied to a compression circuit 46 in accordance with the present invention. The compressed digital image data is then supplied to a bus 48 under control of the central CPU of the system and provided to a storage medium 50. For access by an operator, the compressed digital data supplied from the storage medium 50 through a bus 48 to a local area network controller 51 which sends the compressed images to decompression and image processing circuitry 52 and 52'. Additional work stations may be further served by additional decompression/image processing circuits. Associated with each decompression/image processing circuit 52 (52') is a suitable display means 54 (54') and data entry means such as a keyboard 56 (56').

Figure 3:
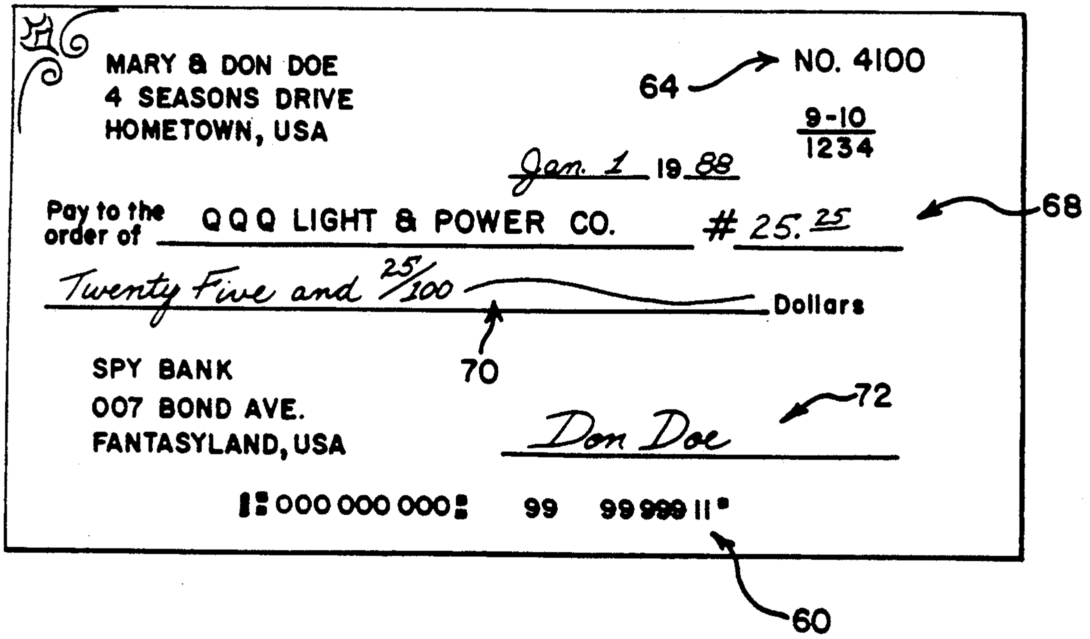
FIG. 3 represents a typical document, a personal check, which may be processed in a document processing system such as that shown generally by FIGS. 1 and 2.

FIG. 3 illustrates a typical document to be scanned and entered into the system in a remittance processing application. The document illustrated in FIG. 3 comprises a typical personal check which may be submitted for payment of a bill such as a utility bill. In a typical application, the check illustrated in FIG. 3 may be submitted with a remittance stub such as that shown generally in FIG. 4. These documents typically comprise large varieties of symbology. For example, each document may typically contain machine readable characters 60 at the base of the document shown in FIG. 3 and machine readable characters 62 as at the base of the document in FIG. 4. The machine readable characters may be significantly darker as a result of pre-printing. Also, other symbology on the face of the document may be of a darker contrast as a result of pre-printing. For example, the check number shown in FIG. 3 by reference character 64 or the account number shown at the reference character 66 in FIG. 4. In contrast, other important data or symbology on the face of the document may be significantly lighter. For example, the courtesy amount 68 on the face of the check in FIG. 3 may be relatively light in comparison to the machine readable code 60 on the same document. Nonetheless, the courtesy amount may comprise extremely instant information for the system operators. Likewise, the handwriting shown in the portion 70 of the check in FIG. 3 and the signature 72 on the same check may be of variable intensity, especially when scanned at high speed in a typical document processing systems, but are still needed for the operation. As such, the present invention seeks to provide a suitable display of each document in the document processing system for ready use by an operator. One such display is shown generally in the illustration of FIG. 5, in which the check shown in FIG. 3 is displayed in conjunction with the associated remittance stub of FIG. 4.

Figure 4:
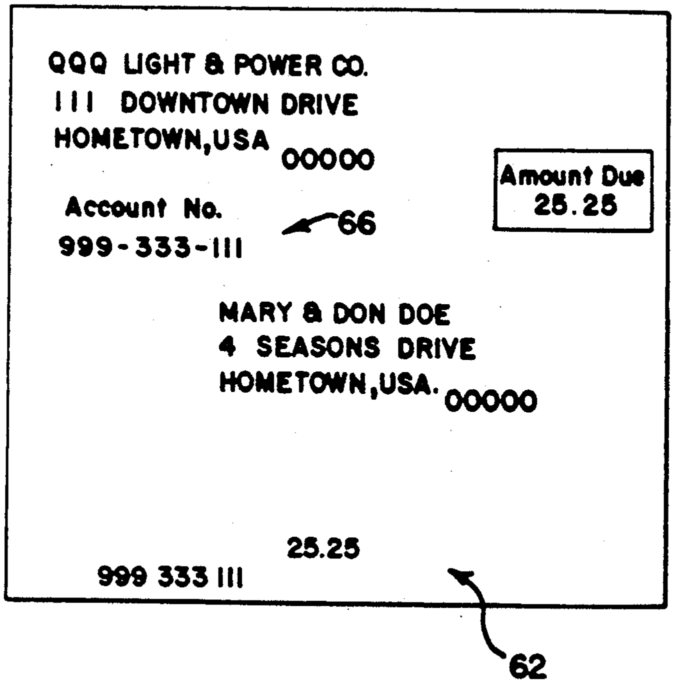
FIG. 4 illustrates a general representation of a related document which may also be processed in a system such as that shown generally in FIGS. 1 and 2.
Figure 5:
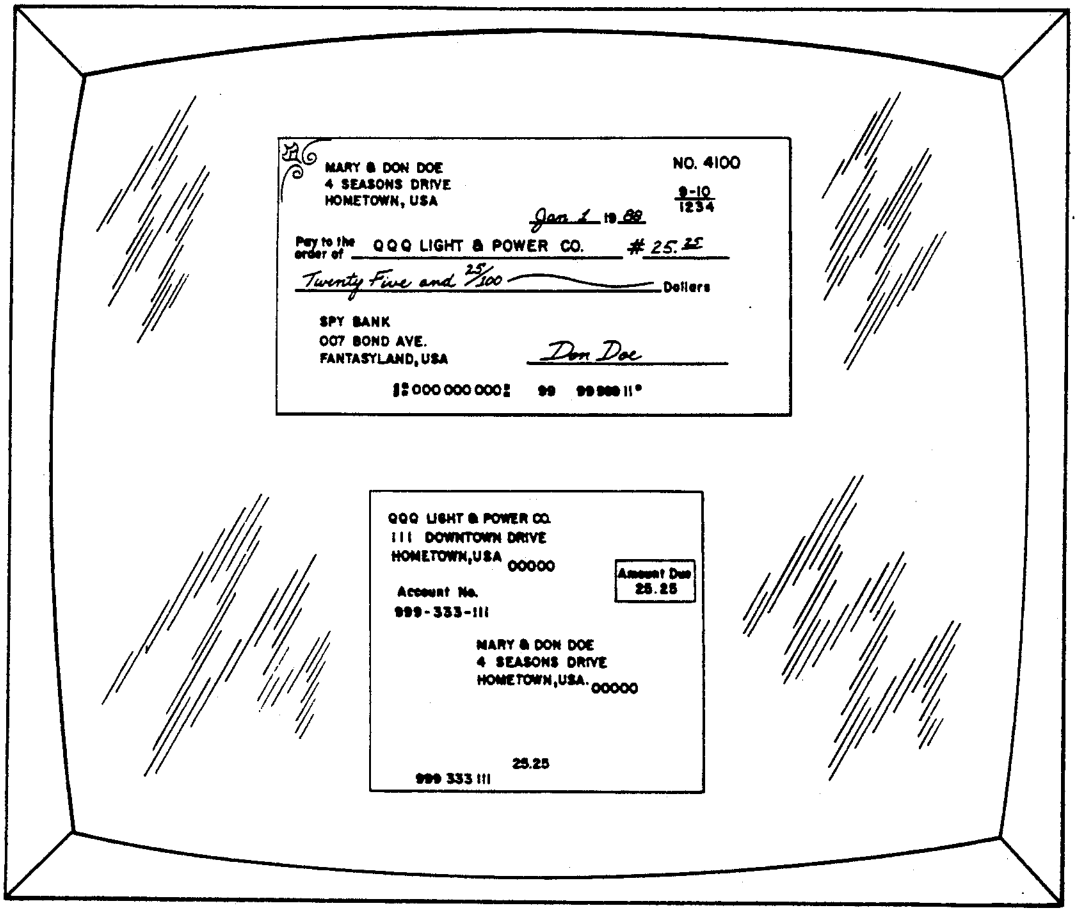
FIG. 5 illustrates a typically desired display for an operator in use of a document processing system such as that shown in FIGS. 1 and 2, including display of the documents shown generally by FIGS. 3 and 4.

It will be appreciated by those skilled in the art that intermediate the paper stage of the document processing illustrated in FIGS. 3 and 4 and the CRT display stage illustrated in FIG. 5, the video signals representative of the scanned document must be processed. If the document is not to be displayed immediately, those signals must be stored in some fashion. In the preferred embodiment, such as in the system of FIG. 2, the camera 42 provides the video signals to the image processing stage 44. As maximum resolution is desirable, the output of the image processing stage 44 should comprise an array of pixel information, each pixel being represented by a gray scale value. In the preferred embodiment, the gray scale value is limited to four bits of information for design reasons. However, the number of bits assigned to the gray scale value for each pixel may be chosen in accordance with the needs of individual applications.

Figures 6, 8:
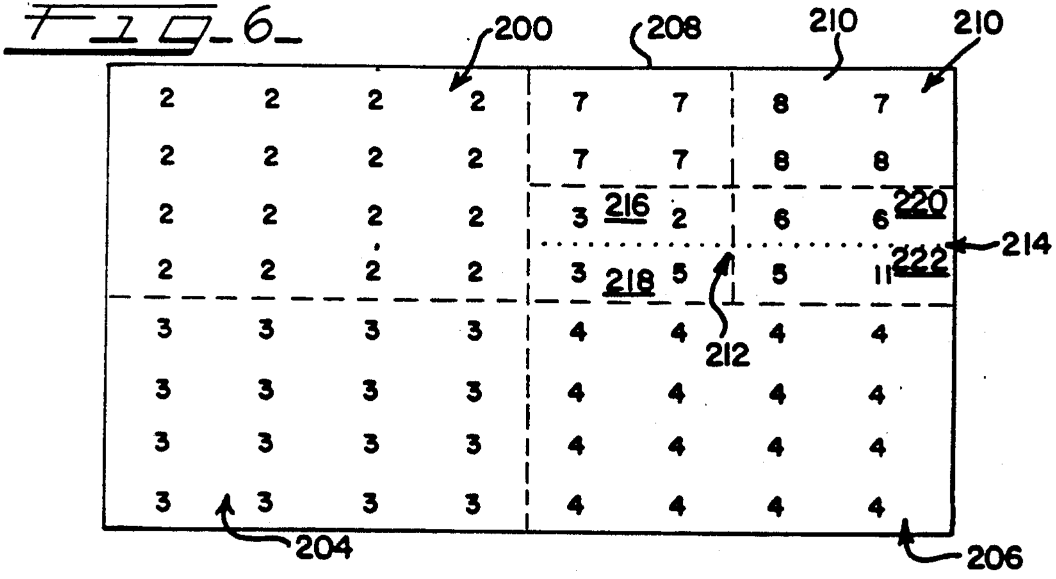
FIG. 6 illustrates one portion of a gray scale data array representative of an 8×8 pixel portion or block of a document image.
FIG. 8 is an illustration of gray scale pixel values for an 8×8 pixel array which has been reconstructed from the stored, compressed data derived from the 8×8 pixel array of FIG. 6.

FIG. 6 illustrates an array of pixels each being assigned a particular gray scale value. In the illustration of FIG. 6, a gray scale value between 0 and 15 is determined for each pixel in accordance with the limit on four bits of information for the gray scale values. FIG. 6 represents an 8×8 subarray of a much larger array corresponding to the entire document image. In a preferred embodiment, the document image would typically be 640×256 pixels. In the system of the present invention, the gray scale data for the document image is to be compressed for storage in an appropriate memory medium. In accordance with the present invention, the array comprising the entire document image is subdivided into subarrays, for example, a 16×16 pixel array or an 8×8 pixel array such as that shown in FIG. 6. At whatever size subarray is chosen for the first level, a determination is made as to whether all of the pixels in that subarray have the same gray scale value. If they do, a code is stored which indicates that the defined subarray has pixels all of the same gray scale value and stores the appropriate gray scale value for that subarray block. In the preferred embodiment, the code comprises a five bit binary code. A one in the most significant bit indicates that the subarray contains pixels all having the same value. The next four bits of the code then give the four bit gray scale value for the pixels in that block. If all of the pixels in the subarray do not have the same gray scale value, a zero is stored in the highest bit position. Further processing is then performed as explained below.

When the first defined subarray in the document image array does not contain pixels all having the same gray scale value, that subarray is further subdivided. In the preferred embodiment, the subarray is divided into four square additional subarrays. For example, if the first subarray is a 16×16 pixel block, the next level of processing will be performed on the individual 8×8 pixel blocks, four of which together comprise the original 16×16 pixel block. The same type of processing has been done for each 8×8 array as was done for the original 16×16 bit array.

This type of processing is repeated until the block size reaches 2×2 pixels. When each 2×2 pixel block contains pixels all having the same gray scale value, the same type of five bit code is entered for that block indicating that the pixels are all the same and storing a four bit gray scale code. However, if all of the pixels in the 2×2 block are not the same, a determination is made of the difference between the highest pixel value and the lowest pixel value. If that difference is less than or equal to a chosen threshold, then all the pixels in that block are set to the most popular value. A five bit code is then entered for that block indicating that all the pixels are the same and storing the gray scale value for the most popular pixel in the actual image array.

If the difference between the highest and lowest pixel values in a 2×2 block is not less than or equal to the chosen threshold, the 2×2 block is further subdivided into two 1×2 pixel blocks. The same threshold determination is made between the two pixel values which comprise the 1×2 block, although the threshold value need not necessarily be the same threshold value as that used in conjunction with analysis of the 2×2 pixel block. If the pixels in the 1×2 block do not differ by more than the chosen threshold value, each of the pixels is set to a value of one of the two pixels according to whatever default decision has been made. This is similar to setting the pixel values equal to the most popular pixel value as is done in conjunction with the 2×2 block and may then be done on any selected basis. For example, the pixels in the 1×2 block may always be set to the lower or the higher of the two pixel values.

If, however, the two pixel values in the 1×2 block differ by more than the selected threshold, a special code must be entered for that 1×2 pixel block. According to the present invention, first a five bit code is entered which indicates that the two values in the 1×2 block are not the same and stores the four bit code for the gray scale value of the first pixel. The actual difference between the first and second pixel is determined. The actual difference is used to index into a quantization look-up table which returns a quantized difference. This is followed by a code representative of the quantized difference between the two pixel values. In the preferred embodiment, this additional portion of the code may vary in length from two to seven bits. The following Table I provides a correlation between the difference between the pixels, the number of bits in the additional portion of the code and the actual additional portion of the code. In fact, all such instances in which the additional code length is seven bits, the code comprises a three bit code of "111" followed by a four bit code representative of the gray scale value of the second pixel.

Since unequal length coding is used, it is desirable to use the shorter compression codes whenever feasible. Typically, the change from pixel to pixel will be relatively small due to the basic nature of the documents being processed, i.e.. there are fairly few edges in the document. For instance, a difference of −2 or +2 requires only a two bit code. (Refer to Table I). If an actual difference of —3 is encoded it takes three bits. If, however, that —3 is encoded as —2 then only two bits are required. Table I shows how actual input differences are encoded as quantized differences. There is some data loss associated with doing this. But, careful examination of the table will reveal that differences larger than ±5 are left untouched. The reason that higher differences are not modified is that high differences occur when there is medium to high contrast, e.g., black writing on white paper. This type of difference would typically be found in the areas of primary interest on the document, such as the dollar amount area 68 in FIG. 2. Since this is the primary area of interest, information in those areas is not modified.

Overall, the method of the present invention takes advantage of the relatively low frequency content of the documents most likely to be encountered in the system of FIG. 1. That is, the documents of FIGS. 3 and 4 have large areas of solid color. It is desirable to store the pixel data for these areas as compactly as possible, especially because no data is lost. The present method accomplishes this by identifying the same gray scale value blocks. When the present method reaches the 2×2 block level, some data may be lost by making the blocks the same. However, by choosing relatively small threshhold values, the actual loss is minimized. At this point, the present method recognizes the physical constraints of the human eye.

| Quantized Difference | # of Bits | Code |
|---|---|---|
| −15 | 7 | 111 <pixel value> |
| −14 | 7 | 111 <pixel value> |
| −13 | 7 | 111 <pixel value> |
| −12 | 7 | 111 <pixel value> |
| −11 | 7 | 111 <pixel value> |
| −10 | 7 | 111 <pixel value> |
| −0 | 7 | 111 <pixel value> |
| −8 | 7 | 111 <pixel value> |
| −7 | 7 | 111 <pixel value> |
| −6 | 7 | 111 <pixel value> |
| −5 | 7 | 111 <pixel value> |
| −4 | 4 | 1101 |
| −3 | 3 | 101 |
| −2 | 2 | 01 |
| +2 | 2 | 00 |
| +3 | 3 | 100 |
| +4 | 4 | 1100 |
| +5 | 7 | 111 <pixel value> |
| +6 | 7 | 111 <pixel value> |
| +7 | 7 | 111 <pixel value> |
| +8 | 7 | 111 <pixel value> |
| +9 | 7 | 111 <pixel value> |
| +10 | 7 | 111 <pixel value> |
| +11 | 7 | 111 <pixel value> |
| +12 | 7 | 111 <pixel value> |
| +13 | 7 | 111 <pixel value> |
| +14 | 7 | 111 <pixel value> |
| +15 | 7 | 111 <pixel value> |

Figure 7A:
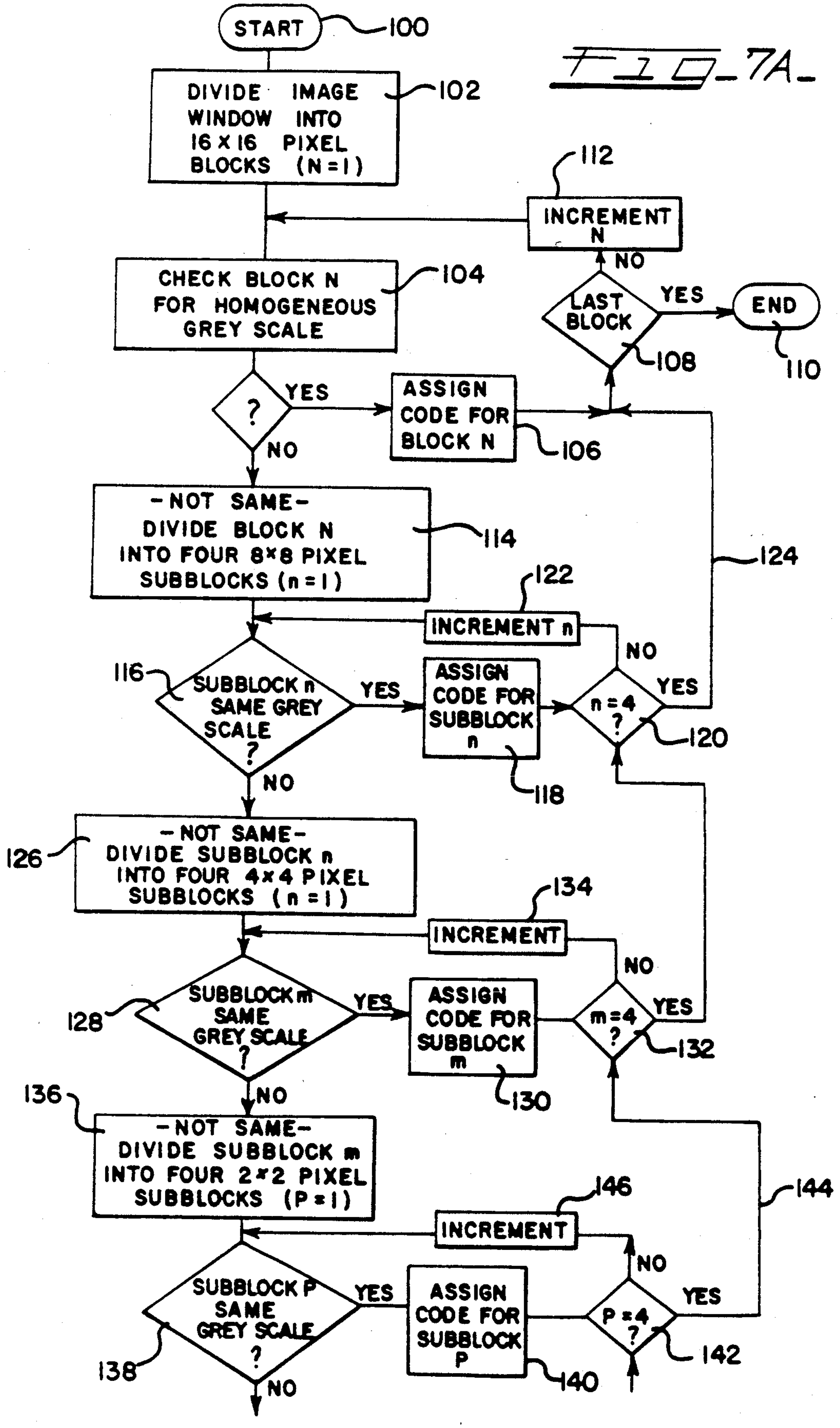
FIGS. 7A and 7B together represent a logical flow chart for a gray scale compression algorithm which may be implemented in accordance with the present invention.
Figure 7B:
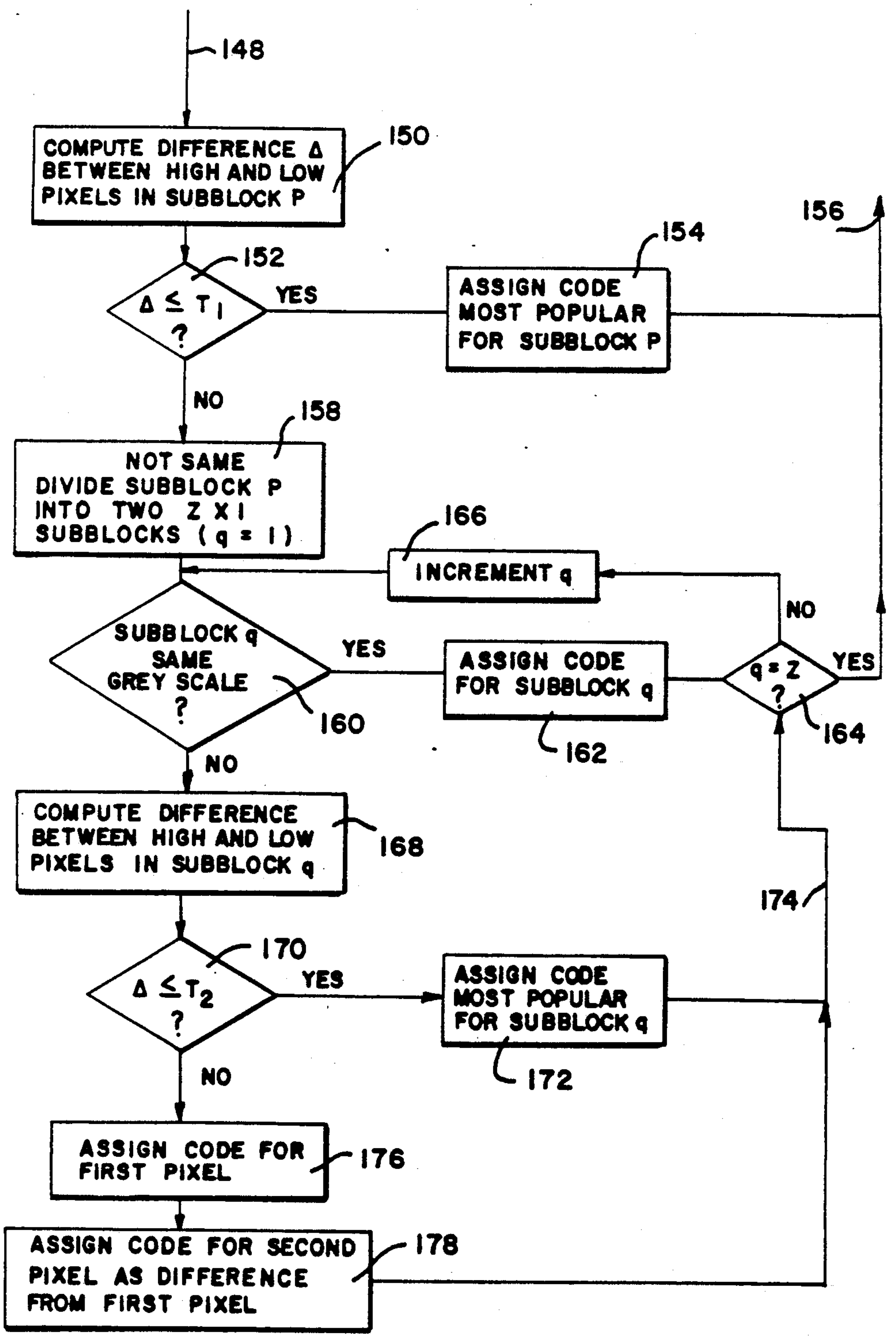

Referring now to FIG. 7A and 7B, therein is shown a logic flowchart for implementation of the described gray scale compression technique. The system begins generally as shown at start block 100. At that time, the system divides the entire document image into a first array of ã given size, in this instance a 16×16 pixel block as shown at a block 102. In the preferred embodiment processing begins with 8×8 blocks as in many applications, larger (16×16) blocks of equal value may be too rare to justify the extra cost. The system of the present invention in its preferred embodiment envisions processing each 8×8 pixel block beginning with the pixel in the upper left corner of the block. To generally illustrate this point, block 102 in FIG. 7A shows an initialization of a counting integer N at one (N=1). This is given by way of illustration only and the system may keep track of which block is being processed in whatever fashion is deemed most convenient for a particular implementation.

Once the image has been divided into 16×16 blocks, and some initialization scheme is established for keeping track of which block is being processed, the system advances as shown to a block 104 at which it determines whether all of the pixels in the 16×16 block N have the same gray scale value. If yes, the system advances as shown to a block 106 at which a code is assigned for that block, representative of the gray scale value. In the preferred embodiment, this code comprises a one (1) (indicative of all pixels in the block having the same gray scale value) followed by a four-bit representation of that gray scale value. The system then looks, at a block 108, to determine whether the last block has been processed. If so, the system determines that the compression task has been completed as shown at an end block 110.

If the last block has not been processed, the system moves on to the next block for compression as shown generally by a block 112, which indicates an incrementing of the integer N. The system then checks again whether the next block N contains pixels which all have the same gray scale value as shown at the block 104.

Whenever a 16×16 block is encountered which does not contain all pixels of the same gray scale value, the system advances as shown to a block 114, at which the 16×16 block N is subdivided into four 8×8 pixel sub-blocks. A code is also stored indicative of a lack of sameness in the first array block. In the preferred embodiment, the code is a zero (0). Again, some sort of scheme must be implemented to keep track of which sub-block is being processed. Accordingly, as shown in FIG. 7A, an initialization is implemented at the block 114. In this case, n is set to 1.

Once the system has divided the original 16×16 block into 8×8 sub-blocks, it determines whether each sub-block contains pixels all having the same gray scale value as shown generally at a block 116. If the sub-block n does contain all pixels having the same gray scale value, a code is assigned for that sub-block as shown generally at a block 118. Again, this code comprises a one (1) followed by a four bit gray scale Then, as shown at a block 120, the system determines whether all four of the sub-blocks have been processed. This may be accomplished by the initialization scheme shown by determining whether n=4. If not, the system advances to the next 8×8 sub-block as shown generally by a block 122 at which n is incremented. If the last 8×8 sub-block has been processed, the system then advances as shown by a line 124 to the block 108 at which it determines whether the last of the 16×16 original blocks have been processed.

Whenever the system determines, at the block 116, that an 8×8 sub-block does not contain pixels all having the same gray scale value, the system stores a code indicating that the block is not the same and further subdivides the 8×8 block into four 4×4 pixel sub-blocks as shown generally at a block 126. At the box 126, an initialization scheme is again implemented in order to keep track of which sub-block has been or is being processed. In this instance, m is set to 1. Thus, when m reaches four, all four of the 4×4 sub-blocks will have been processed.

Once the system has subdivided an 8×8 sub-block into 4×4 pixel sub-blocks, it must determine whether each of the 4×4 sub-blocks contains pixels all having the same gray scale value. This is accomplished as shown generally at a block 128. If a sub-block m contains pixels all having the same gray scale value, a code is assigned for that sub-block m as shown at a block 130. The system then determines whether the last of the 4×4 sub-blocks has been processed, as shown generally at a block 132 in which m is compared to four. If a 4×4 sub-block remains to be processed, the system advances to the next 4×4 sub-block as generally shown at a box 134, at which m is incremented. At that time, the system repeats the test for whether the 4×4 sub-block contains pixels all having the same gray scale value.

When a 4×4 sub-block is encountered in which all of the pixels do not have the same gray scale value, the method of the present invention stores a not-same code and further subdivides that 4×4 sub-block into four 2×2 pixel sub-blocks as shown generally at a box 136. Again, a scheme is implemented for keeping track of which sub-block is being processed. In the illustrated example, this is done by setting an integer p equal to 1 at the time of dividing the sub-block. Once p has been incremented to 4, all four of the 2×2 sub-blocks will have been processed.

As before, the system then determines whether the sub-block p contains pixels all having the same gray scale value, as shown generally at a box 138. If yes, then the system assigns a code for that sub-block p as shown at a box 140. Then, the system determines whether all of the 2×2 sub-blocks have been processed, as shown generally at a decision box 142 in which p is compared to 4. If the last block has been processed, the system loops back to determine whether all of the 4×4 sub-blocks have been processed as shown generally at a line 144. If a 2×2 block remains to be processed, the system moves on to the next 2×2 block as shown generally at a box 146 in which the integer p is incremented.

Once a sub-block p has been encountered in which all of the pixel values do not have the same gray scale value, further processing is required. This additional processing is shown in the continued flow chart in FIG. 7B.

Line 148 at the top of FIG. 7B connects with the decision block 138 at the base of FIG. 7A. This indicates that a sub-block p, a 2×2 sub-block, has been encountered in which all of the pixels do not have the same gray scale value. At this time, the system computes the difference Δ between the highest value and lowest value of gray scales for the pixels in sub-block p as shown generally at a box 150. If the difference Δ is less than or equal to a threshold, $T_1$, as shown at a box 152, the method of the present invention treats that sub-block p as having a single gray scale value. Accordingly, the code is assigned for sub-block p as shown at a box 154. The assigned code is that corresponding to the most popular of the gray scale values within the sub-block p. At that time, the system then determines whether all of the 2×2 sub-blocks have been processed, as shown by a line 156 which connects back to the decision block 142.

If the difference Δ between the highest and lowest pixel values in sub-block p is not less than or equal to the threshold, $T_1$, the system further subdivides the sub-block p into two 2×1 sub-blocks as shown generally at a box 158. Again, an initialization scheme is implemented. In this instance, an integer q is set equal to 1.

Once again, the system determines whether the sub-block q contains pixels all having the same gray scale value, as shown generally at a box 160. If yes, as shown at a box 162, the system defines a code for that sub-block q. The system then determines whether the last of the 2×1 sub-blocks has been processed by ascertaining whether the integer q is equal to 2 as shown at a box 164. If yes, the system loops back via line 156 to determine whether all of the 2×2 sub-blocks have been processed. If a 2×1 sub-block remains to be processed, as determined at the decision block 164, the system advances to the next 2×1 sub-block as shown generally at a box 166, at which the integer q is incremented. When a 2×1 sub-block is recognized as not having pixels all having the same gray scale value, the system again determines the difference Δ between the highest and lowest gray scale values for pixels in the sub-block q as shown generally at a box 168 in FIG. 7. If the difference Δ is less than or equal to a threshold, $T_2$, as shown at a decision block 170, the system treats the 2×1 sub-block as having a single gray scale value. In this fashion it assigns a code for the 2×1 sub-block q as shown generally at a box 172 and returns via a line 174 to determine whether all of the 2×1 sub-blocks have been processed as described above.

If, however, the difference Δ is not less than or equal to the threshold $T_2$, the system assigns a code for the gray scale value for the first pixel as shown generally at a box 176. The system then assigns a code for the second pixel representative of the difference (in accord with the values of Table I) in gray scale value between the first pixel and the second pixel as shown at a box 178. Once a code has been assigned for each of the 2×1 sub-blocks, the system returns and repeats until a serial bit string has been generated representing the compressed data for the entire original 16×16 array block. The system then advances to the next 16×16 array block until the entire document image has been compressed and stored. The system then advances to the next document.

Referring again to FIG. 6, a bit string representative of the 8×8 gray scale pixel array shown therein may be generated in accordance with the previously described method, consistent with the logic flow chart of FIG. 7A and 7B. The first step comprises a determination of whether the 8×8 block contains sixty-four pixels, all having the same gray value. As shown, the 8×8 block is not comprised of a single gray scale value. Accordingly, the 8×8 block must be subdivided in accordance with the present invention. A zero forms the first entry in the bit string to indicate that the 8×8 block is not the same.

As shown in FIG. 6, the 8×8 block may be subdivided into four 4×4 blocks 200, 202, 204 and 206. A determination of sameness must be made for the 4×4 blocks in sequence. Beginning with block 200, it can be seen that all 16 pixels in this 4×4 block have the same gray scale value in the illustrated example. Accordingly, a one is stored as the next bit in the bit string to indicate that the block is the same. This is followed with a four bit code comprised of 0010 which indicates that the gray scale value for the block 200 is 2.

The system then advances to the block 202, which is not comprised entirely of pixels having the same gray scale value. Accordingly, a zero forms the next entry in the bit string and the block 202 is subdivided into four 2×2 blocks 208, 210, 212 and 214. Each of the 2×2 blocks must then be evaluated for sameness. It can be seen that block 208 contains four pixels all having the same gray scale value. Accordingly, a "1" is placed as the next bit in the bit string to indicate the sameness of this block. The entry 0111 then follows to indicate that the gray scale value is seven. The system then moves on to the next 2×2 block 210. An initial glance shows that this block is not the same. However, if the threshold value $T_1$ is chosen as 1, it can be seen that the difference between the highest and lowest pixel in this 2×2 block is less than or equal to the threshold. Accordingly, the block is assigned a gray scale value equivalent to the most popular pixel value. As 8 appears in three out of four pixels, it is the most popular value and the block is assigned a gray scale value of 8. Accordingly, a 1 is entered as a next bit in the bit string followed by the entry 1000 indicating the gray scale value as 8.

If, however, the 2×2 bock comprises two 2×1 blocks each having a single gray scale value (e.g., 5,5 and 8,8 for pixel values), the system must default to one or the other as chosen by the user. In this situation, a "1" is stored followed by the code for the default gray scale value.

The system then advances to the 2×2 block 212 to determine whether it is the same. This block is not the same and a zero is entered as the next bit in the bit string. This 2×2 block 212 cannot be made to be the same in the fashion that the 2×2 block 210 was able to be made the same. Accordingly, the 2×2 block 212 must be subdivided into two 1×2 blocks 216 and 218.

The first 1×2 block 216 is not the same, however, it can be made the same if the threshold is chosen at 1. Accordingly, a "1" is entered as the next bit in the bit string indicating that it is the same and is followed by the entry 0011 indicating that the gray scale value is 3. In this instance, the most popular pixel is chosen as the larger value of the two pixel values in the 2×1 block.

The system then looks at the next 1×2 block 218. In this case, the 1×2 block is not the same and a "0" is entered in the next position of the bit string. This is followed by an entry 0011 indicating that the first pixel value is 3. This is followed by the entry 01 which is a difference code between the two pixels in the 1×2 block 218 as determined in accordance with the values given in Table I.

The system then moves on to evaluating the next 2×2block 214. Again, the 2×2 block 214 is not the same and a "0" is placed as the next entry in the bit string. This 2×2 block cannot be made to be the same and it is accordingly further subdivided into two 2×1 blocks 220 and 222. The first 1×2 block 220 is the same and a "1" is entered as the next bit in the bit string. This is followed by the entry 0110 indicating that the gray scale for the 2×1 block 220 is 6. The system then evaluates the next 1×2 block 222 and determines that it does not have two pixels having the same gray scale value. Accordingly, a "0" is placed in the next bit in the bit string, followed by entry 0101 indicating that the first pixel value is 5. The next seven bits of the bit string comprise a difference code to represent the difference between the first and second pixels in the 1×2 block 222. Referring to Table I again, it can be seen that the next 7 bits should comprise the entry 1111011. In this portion of the code, the last four bits, 1011, represent the actual pixel gray scale value for the second pixel in the 1×2 block.

The system then moves on to evaluate the next 4×4 block 204. This block is the same and a "1" is placed as the next bit in the bit string. This entry is followed by the code 0011 indicating that the gray scale value of block 204 is 3. The system then moves on to the final 4×4 block shown in FIG. 6, block 206. This block is also the same and a "1" is placed as the next bit in the bit string. The last four bits in the bit string then comprise the entry 0100 indicating that the gray scale value of the block 206 is 4.

The following Table 2 describes the bit string for FIG. 6 in accordance with the gray scale compression method of the present invention. That bit string described above reads as follows:

| Code | Meaning |
|---|---|
| 0 | The 8 × 8 block is not same. |
| 1 | The first 4 × 4 block is same. |
| 0010 | Value is 2. |
| 0 | The next 4 × 4 block is not same. |
| 1 | The first 2 × 2 block is same. |
| 0111 | Value is 7. |
| 1 | The next 2 × 2 block is same. |
| 1000 | Value is 8. |
| 0 | The next 2 × 2 block is not the same. |
| 1 | The first 1 × 2 block is same. |
| 0011 | Value is 3. |
| 0 | The next 1 × 2 block is not same. |
| 001101 | Difference error code. |

-continued

| Code | Meaning |
|---|---|
| 0 | The next 2 × 2 block is not same. |
| 1 | The first 1 × 2 block is same. |
| 0110 | Value is 6. |
| 0 | The next 1 × 2 block is not same. |
| 01011111011 | Difference error code. |
| 1 | The next 4 × 4 block is same. |
| 0011 | Value is 3. |
| 1 | The next 4 × 4 block is same. |
| 0100 | Value is 4. |

Reproduction of the stored image data may be had simply by reversing the process described above. This may be done readily through software implementation if desired, or may be implemented through hardware. It should be appreciated that some data from the original image is lost through the approximations associated with the described method. This can be seen readily by review of FIG. 8, an illustration of a reconstructed 8×8 array, and comparison with the 8×8 array of FIG. 6. FIG. 8 has been reconstructed from the bit string generated from FIG. 6 in accordance with the described method.

As mentioned, the method described above may be implemented in any suitable fashion, for example, with a software driven microprocessor or minicomputer system, or in discrete hardware. Implementation of this method in software tends to be relatively slow because of the large number of steps necessary to evaluate the large pixel arrays associated with the document images. However, software implementation is deemed to be suitable in conjunction with stage (52') of the system of FIG. 2, when extremely high speeds are not crucial to the operation of the system and the relatively slow pace of an operator facilitates software decompression of the stored data for performing the operator functions and display. It will be appreciated that this truly is a relatively slow operation compared to the very high speed, initial document sorting, scanning and processing. Accordingly, the following description focuses on high speed hardware implementation of one version of the previously described gray scale compression technique to allow for the real-time compression and storage of the document image data as it is generated at the initial document processing stage.

Figure 9C:
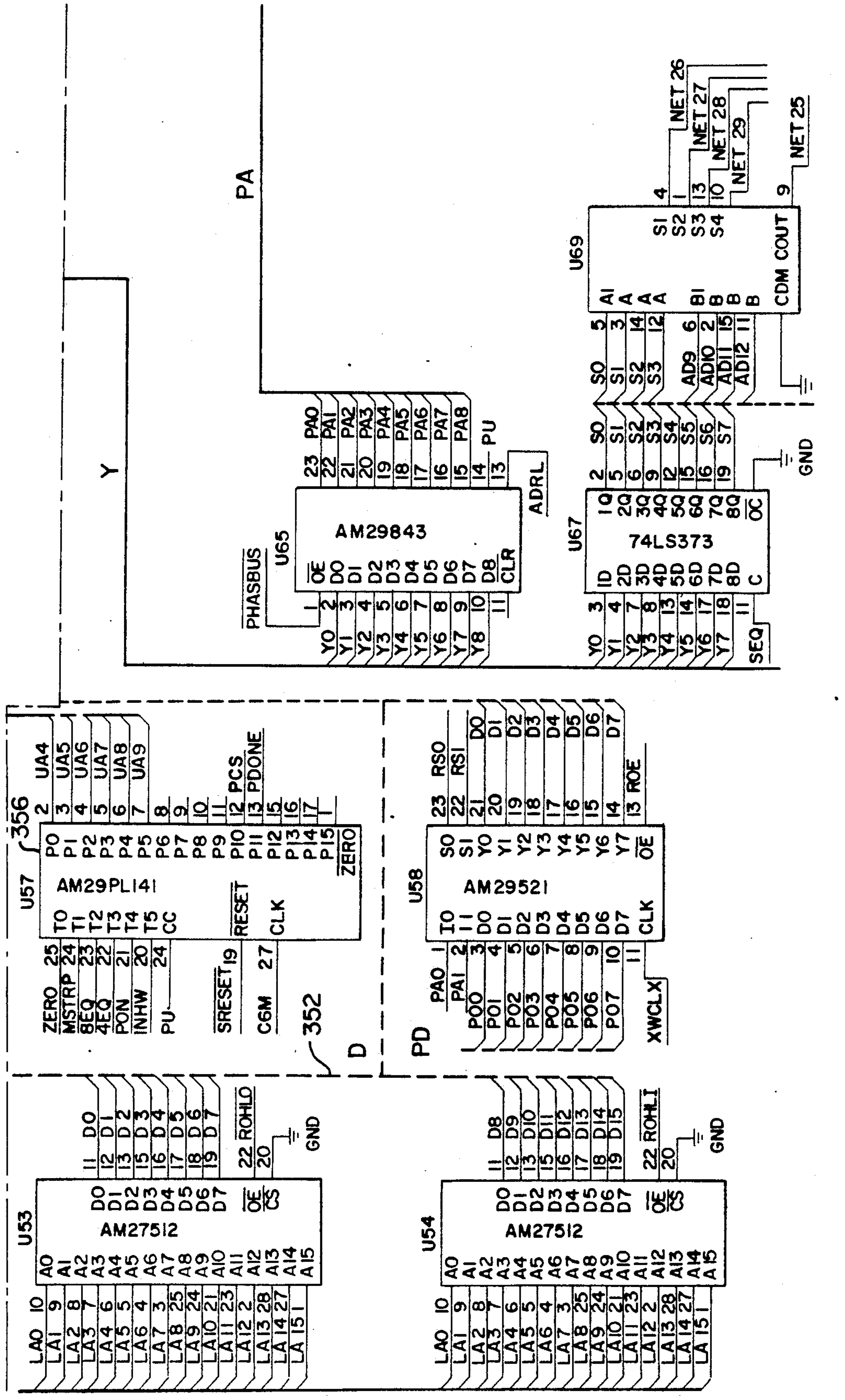
Figure 9C:
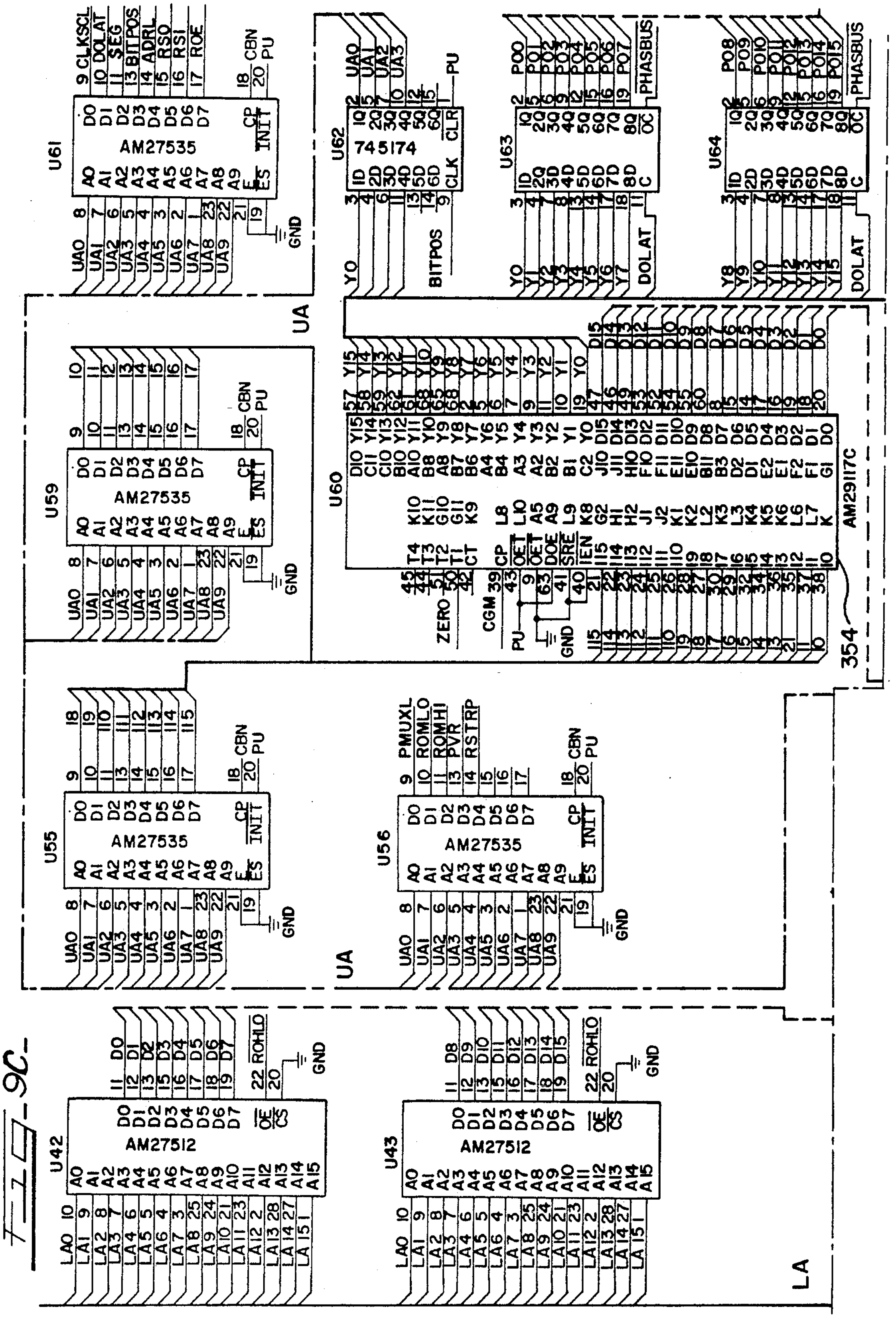
Figures 1, 9C:
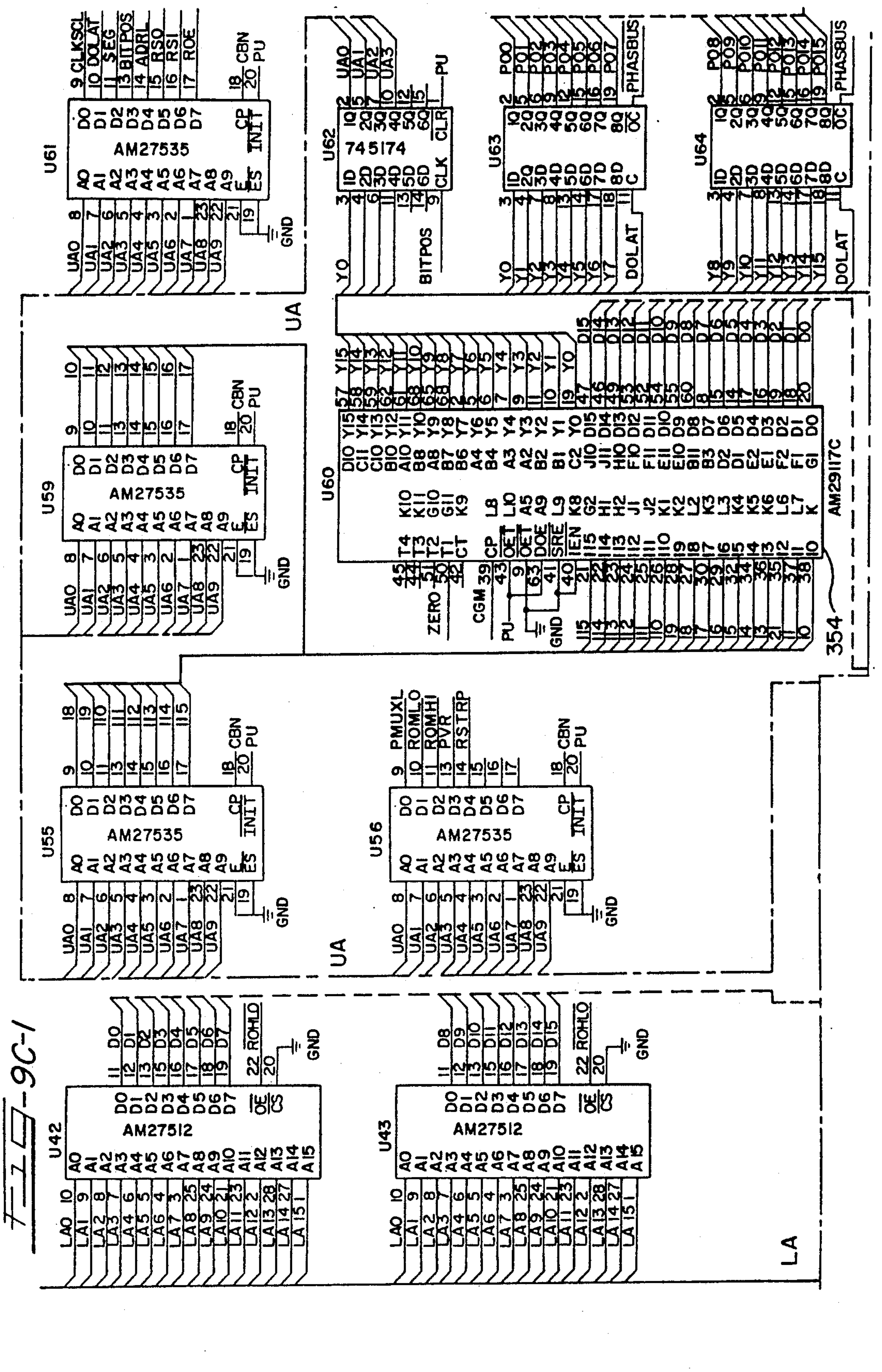
Figures 2, 9C:
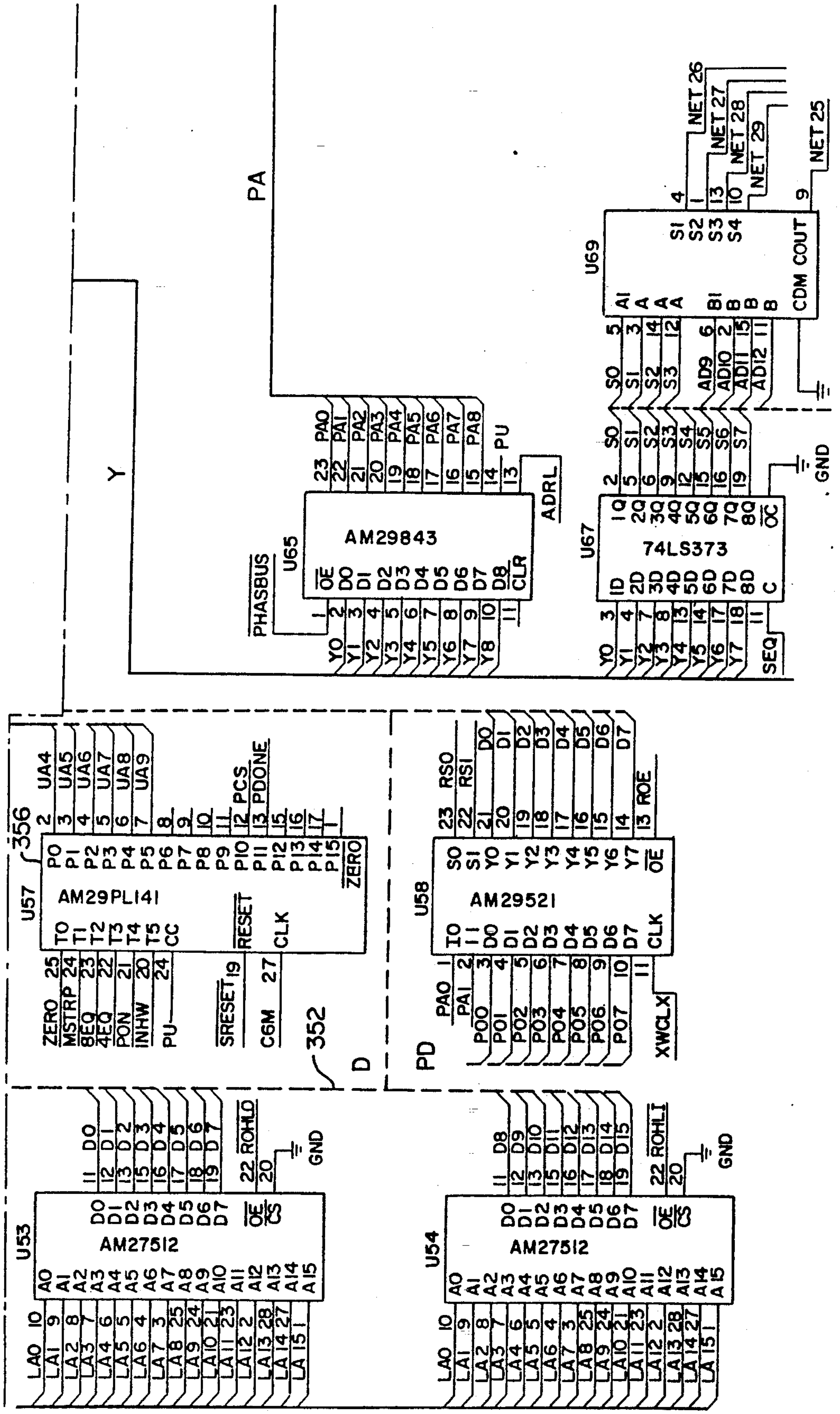

Referring now to FIGS. 9A, 9B, and 9C, therein is shown the circuitry for implementation of extremely high speed, real-time compression of document gray scale image data. The embodiment illustrated in these figures implements the gray scale compression algorithm discussed above, with slight modifications to enhance operating speed characteristics.

Referring now to FIG. 9A, therein is shown a first stage for implementation of the compression circuitry. In FIG. 9A, a first integrated circuit U15 generates a first output signal on a line 300 in response the input address signals received from a bus 302. The first output signal on the line 300 indicates that the address received corresponds to the upper left pixel in an 8×8 block (an "upper-left-8 pixel"). The integrated circuit U15 provides a second output signal on a line 304 whenever the received address signals from the bus 302 indicate that the current pixel represents the upper left pixel in any 4×4 block (an "upper-left-4 pixel").

Figure 10:
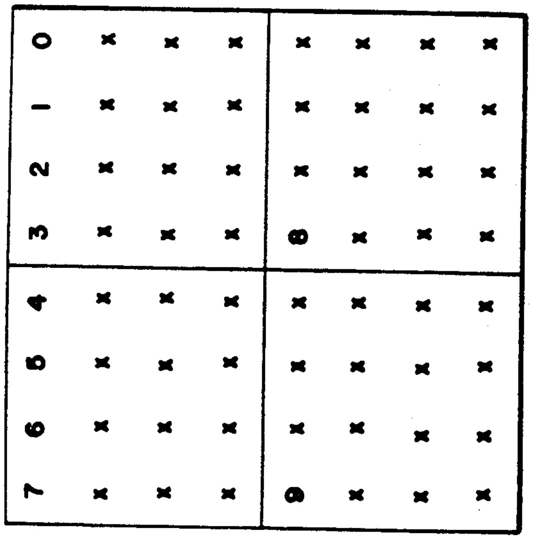
FIG. 10 illustrates an 8×8 pixel array providing for identification of upper-left-8 and upper-left-4 pixels within that 8×8 pixel array.

This concept is shown generally in accompanying FIG. 10. In FIG. 10 when the addresses for the pixels associated with the gray scale values 3, 7, 8, and 9 are received on the bus 302, the integrated circuit U15 would provide an output signal on the line 304 indicating that the address was the upper left pixel in a 4×4 block of pixels. Correspondingly, when the pixel corresponding to the value 7 in FIG. 10 was indicated by the address on the bus 302, the integrated circuit U15 would provide an output signal on the line 300 indicating that the pixel address given was the upper left pixel in the 8×8 block shown in FIG. 10.

The signal on the line 300 is supplied at a line 306 to a RAM device U13 as a write enable signal. This enables the RAM U13 to write the data present on the bus 308 at its data input terminals at the address given by the address currently present on the bus 302. In this fashion, the gray scale value for the upper left pixel in each 8×8 block is written into the RAM U13.

Correspondingly, the signal from the line 304 from integrated circuit U15 is supplied at a line 310 to a second RAM U14 as a write enable signal. Thus, the RAM U14 will then write the gray scale value present on the bus 308 at its data input terminals at the location given by the current address on the bus 302, whenever an upper-left-4 pixel is addressed.

Each of the two RAMs U13 and U14 then provides the stored gray scale value as an output. The first RAM U13 provides the stored gray scale value as output on a four line bus 312 to a first comparator U16. The second RAM U14 provides the stored gray scale value from its data output terminals on a four line bus 314 to a second comparator U17.

The first comparator U16 then continually compares the gray scale value for the upper left pixel each 8×8 block received from the bus 312 at its inputs B0, B1, B2 and B3 with each succeeding pixel value in that 8×8 block as it is received from the bus 308 at its input terminals A0, A1, A2, and A3. The output signal on a line 316 indicates whether the gray scale values are equal. The output signal on the line 316 will remain high as long as the current gray scale value on the bus 308 is equal to the originally stored gray scale value corresponding to the pixel at the upper left corner of the 8×8 block. Correspondingly, the second comparator U17 continually compares the stored gray scale value for the upper left pixel of the 4×4 blocks as received from the bus 314 at its input terminals B0, B1, B2 and B3 with the current pixel gray scale value received from the bus 308 at its input terminals A0, A1, A2 and A3. An output signal on a line 318 indicates where the two values are equal. The output signal on line 318 will remain high as long as the current gray scale value on the bus 308 remains equal to the originally stored gray scale value for the pixel in the upper left corner of the current 4×4 block.

Referring now to FIG. 9B, therein is shown, further circuitry for implementing the gray scale compression technique discussed above. The common buses 302 and 308 are identified, 302 being the address bus and 308 being the data bus. In the implementation of the preferred embodiment, the horizontal and vertical counts indicative of the horizontal and vertical address for each pixel in the document array are multiplexed onto the address bus as a cost savings. All addressing is done during the blanking interval typically associated with raster scan video signals representative of the pixel information.

Also, in the preferred embodiment a first 8×512×4 RAM is stored with an 8 pixel×512 slice of the document image. As that slice of pixel information is compressed for storage, the next 8×512 pixel slice of the document image, is stored in a second 8×512×4 RAM. This is done under the control of multiplexers operating in two banks. The first bank of multiplexers is shown generally as integrated circuits U32, U33 and U34 in FIG. 9B. The second bank of multiplexers is shown generally by the integrated circuits U44, U45 and U46 in FIG. 9B. This is done under the control of a compression microprocessor in typical multiplexing fashion.

The first 8×512×4 buffer RAM is shown in FIG. 9B as a combination of 9150 integrated circuits U38, U39, U40 and U41. The second 8×512×4 buffer RAM is shown in FIG. 9B as a combination of 9150 integrated circuits U49, U50, U51 and U52.

Each of the two buffer systems also contains a 256×1 RAM in which the data is stored as to whether each 4×4 block in the 8×512 image slice contains pixels all having the same gray scale value. The first 256×1 RAM for the first buffer is shown as U37 in FIG. 9B. The 256×1 RAM for the second buffer network is shown as U48 in FIG. 9B. Correspondingly, each buffer contains a 64×1 RAM which stores data as to whether each of the 64 8×8 blocks in the 8×512 slice of the document image contains 64 pixels all having the same gray scale value. The 64×1 RAM for the first buffer system is shown as U36 in FIG. 9B. The 64×1 RAM for the second buffer is shown as U47 in FIG. 9B.

Generally speaking, the output of each of the comparators U16 and U17 is provided to the corresponding RAM in FIG. 9B, depending upon which of the two buffers is being loaded at a particular moment. That is, the output of U16 is provided to either the RAM U36 or the RAM U47. Correspondingly, the output of comparative U17 is provided to either the RAM U37 or the RAM U48. For purposes of this discussion, the operation of the first buffer network will be explained. The second buffer network operates identically. A logic step is implemented intermediate the signal processing at the comparator and data storage at the 256×1 and 64×1 RAMs. This logic is shown generally for the 8×8 block processing as a circuit in FIG. 11A and for the 4×4 processing by the circuit of FIG. 11B.

Figure 11B:
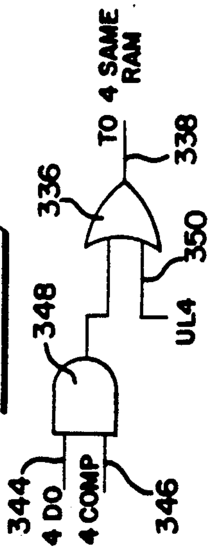
FIGS. 11A and 11B illustrate logic circuitry for storing information indicative of the sameness of 8×8 and 4×4 blocks of a portion of a document image.
Figure 11A:
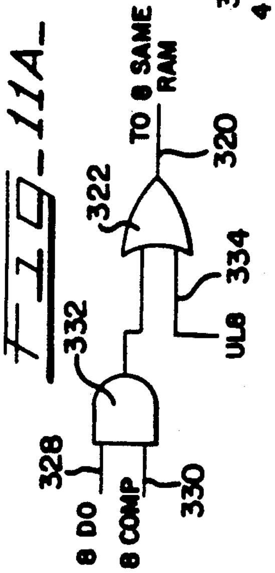

More particularly, the input signal to the RAM U36 is provided by the output of the orgate 322 given on a line 320 in FIG. 11A. This is received on a line 324 in FIG. 9B. The output of the RAM U36 is given on a line 326 which is received as a "8 data out" (8 DO) signal on a line 328 in FIG. 11A. The output of the comparator (Comp) U16 on the line 316 in FIG. 9A is supplied as the comparator (Comp) signal on a line 330 as the other input to an ANDgate 332 in FIG. 11A. The output of the ANDgate 332 comprises one input to the OR gate 322. The other input to the orgate 322 is the upper-left-8 (UL8) signal as supplied on a line 334. Operation of the circuit in FIG. 11A proceeds as follows. Each time the upper left 8 signal is received indicative of the beginning of an 8×8 block, the output of the OR gate 322 goes high which places a "1" in the RAM U36. Thus, the signal on the line 328 will be high, as will the signal on the line 330 as the upper left pixel value will of course be equal to itself. Thus, the output of the ANDgate 332 will be high at least for the duration of the gray scale value associated with the upper-left-8 pixel. Subsequently, the signal on the line 334 will drop low indicating that the address has moved from the upper-left-8 pixel. Once this occurs the output of the ANDgate 332 controls the input to the RAM U36. Thus, whenever the signal on the line 330 goes low indicating that one of the pixels in the 8×8 block is not equal to the value of the upper-left-8 pixel, the output of ANDgate 332 will go low. This will cause the output of the orgate 322 on the line 320 to go low also, which will work its way through to provide storage of a zero in the RAM U36 from the input line 324 and thus the presentation of a low signal at the output on the line 326. This corresponds to the other input to the ANDgate 322 on the line 328. Thus, the output of the ANDgate will remain low, and correspondingly the data stored in the RAM U36 will remain low, until the next upper-left-8 signal is received on the line 334. In this fashion, a "1" is stored in the RAM U36 for the 8×8 pixel block only when all pixels in that block have the same gray scale value as that of the upper left 8 pixel.

The logic circuitry of FIG. 11B operates in an identical fashion with that shown and described in conjunction with FIG. 11A. The output of the orgate 336 on a line 338 communicates with the input line 340 of RAM U37. The output of RAM U37 on line 342 communicates as the four-data-out signal on a line 344. The output of the comparator U17 on the line U18 in FIG. 9A provides the comparison signal on an input line 346 to the ANDgate 343. An upper left 4 signal is received on the line 350. Operation is thus the same as described above. This arrangement provides that a "1" will be stored for each 4×4 block in which all 16 pixels have the same gray scale value.

Thus, as the gray scale value for each pixel in an 8×512 slice of the document image is stored in the 8×512×4 RAM, data as to whether any of the sixty-four 8×8 blocks, which make up the 8×512 slice, have the same gray scale value is stored also in the RAM U36. Likewise, data as to whether any of the two-hundred-fifty-six 4×4 blocks which make up the 8×512 slice have the same gray scale value is stored in the RAM U37. (Correspondingly, if the second buffer is being loaded, the 8×8 information is stored in the RAM U47 and the 4×4 information is stored in the RAM U48.).

Thus, by the time all of the data for an 8×512 slice of the document image has been stored in RAM, the system of the present invention already has available to it information as to each 8×8 block and 4×4 block which comprise that 8×512 slice.

Figure 12:
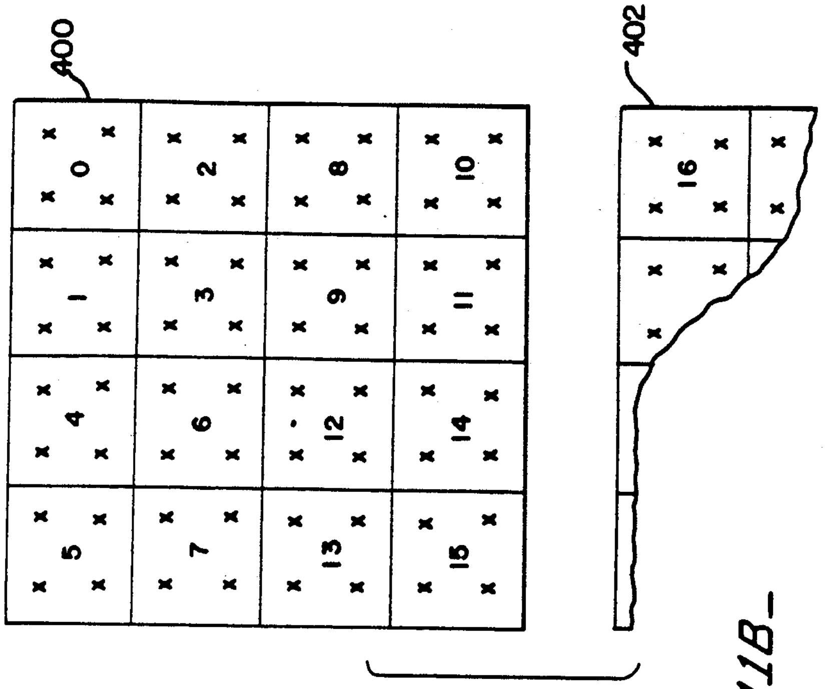
FIG. 12 is an illustration of a portion of a document image for compression showing the addressing sequencing for storage in buffer networks in accordance with one embodiment of the present invention.

The 8×512×4 RAM, for example, that composed of RAM U38, U39, U40 and U41, is configured as a 1K×16 RAM memory for use in the present invention. The gray scale values for the four pixels which comprise each 2×2 group in the 8×512 slice of the original document image are stored as a 16 bit word. The order in which they are stored is shown generally by the diagram of FIG. 12. FIG. 12 shows a complete 8×8 block 400 at the top of the 8×512 slice and a partial 8×8 block 402 which would follow in succession after the first 8×8 block. The individual 2×2 blocks within each 8×8 block are stored in the order shown by the numbering 0–15 within the 8×8 block 400. That is, the four pixels of block 0 are stored as the first 16 bit word in the buffer RAM.

The 16 output lines from each buffer RAM are connected to 16 address lines for a corresponding look up table. This is shown in FIG. 9C. U42 and U43 provide the lookup table for the first buffer RAM comprised of IC's U38, U39, U40, and U41. Correspondingly, IC's U53 and U54 in FIG. 9C comprise a look-up table for the second buffer RAM comprised of IC's U49, U50, U51 and U52. The output of the look-up tables of U42, U43 and U53, U54 is supplied on a data output bus 352.

The output of the look-up table comprises a 32 bit code. The last 5 bits indicate the size of the code, while the top 27 other bits represent the actual coded information. This 27 bit portion of the code may vary from 5 to 26 bits in length.

Operation of the compression hardware is under control of a compression microprocessor 354 in connection with a sequence processor 356 and microcode converter comprised of U55, U56, U59 and U61 which in conjunction with the 4 bit output of the IC U62, controlled by the processor 354, generate the 16 bit control signals for the processor 354 from the 6 bit output of the sequence 356. The sequence 356 comprises a state machine, the logic for which is given in the appended source code listing given in Appendix A hereto. Correspondingly, the microcode for execution of the compression algorithm to control the compression hardware by the processor 354 is given by the attached code listing of Appendix B. Also, the logic for implementation of the look-up tables is given by the source listing of Appendix C. Appendix D gives the actual code outputs from the lookup table in response to the sixteen possible combinations of input to the lookup table.

In operation, the microprocessor 354 must store coded information with respect to the pixel data from the original document image. The microprocessor 354 begins at location zero when processing the new data stored in the buffer RAMs. Rather than comparing all of the pixels in the first 8×8 block or first 16×16 block or first 4×4 block or even the first 2×2 block, the microprocessor proceeds immediately to the 64×1 RAM associated with the 8×8 sameness test performed as the pixel data was entered into the buffer RAM. If the zero location in the 64×1 RAM, for example, U36, contains a "1", the processor then goes to the lookup table and reads the code given by the 16 byte input from the four pixels of the zero 2×2 block Obviously, if the 8×8 block has pixels all the same, then the zero, and all other, 2×2 blocks within that 8×8 block must have the appropriate code. The microprocessor reads that code and stores it and moves on to the next 8×8 block. However, if the 64×1 RAM, such as U36, does not contain a "1" then the zero location in the microprocessor must look to the zero location, the 256×1 RAM associated with the 4×4 block sameness test, such as U37. If a "1" is located in the zero location in the 256×1 RAM, the microprocessor again reads the code given by the 16 bit input to the look-up table from the zero 2×2 block. If the first 4×4 block has pixels all the same, then the zero location 2×2 block must have pixels all the same also. Accordingly, the microprocessor stores the code given by the lookup table as indicative of that 4×4 block and advances then to the next 4×4 block.

However, if a "1" is not stored in the zero location in either of the 64×1, 8-same, RAM or the 256×1, 4-same, RAM the microprocessor must read the code for the zero location 2×2 block and store that block as solely representative of the 2×2 block. The processor then advances to the first, second, and third 2×2 blocks and stores a code for each of those. It then goes to the one location in the 256×1, 4-same, RAM and repeats the process. Likewise, the processor must work through the 2 and 3 locations in the 256×1, 4-same, RAM before it proceeds to the next 8×8 array.

Addressing of the 64×1, 8-same, RAM may be facilitated as that RAM does not need access to the last four address lines. Whenever the last four bits of the address are 0, the processor has completed an 8×8 block and should again move on to the next 8×8 block. Correspondingly, the 256×1, 4-same, RAM does not need access to last two address lines. Whenever the last two address lines are zero, the processor is done with that 4×4 block and should move on to the next one. Accordingly, the last 4 bytes in the address give an indication of where in the process the processor actually is operating. It should be appreciated, that the microprocessor never reads the actual pixel data. Rather, the look-up table is interposed between the pixel data and the processor. The pixel data itself forms the input to the look-up table, and the look up table gives the appropriate code. The four-bit gray scale values for the four pixels comprising the currently addressed 2×2 block continually form the inputs to the look-up tables. The processor knows, as a result of the information already stored in the 256×1, 4-same, RAM; and the 64×1, 8-same, RAM how to increment its addressing through the data stored in the 1K×16 buffer RAM that is, if there is a "1" in the first location in the 8-same RAM, the microprocessor increments the address to the next 8×8 block, the next location in the 8-same RAM. If there is a "1" in the first location of the 4-same RAM, the microprocessor increments to the next 4×4 block, the next location in the 4-same RAM. However, if there is a "0" in the first location of the 4-same RAM, the microprocessor must increment to the next three 2×2 blocks in the 1K×16 RAM.

Thus, the illustrated circuitry in FIGS. 9A, 9B, and 9C provides for a high-speed, real-time implementation of gray scale compression algorithms such as that shown in the block diagrams of FIGS. 7A and 7B. Implementation of the hardware of FIGS. 9A, 9B, and 9C may be had in accordance with the general description given herein. However, by way of illustration, U13 and U14 comprise AMD integrated circuits 93422A in the preferred embodiment. Correspondingly, U15 comprises a 20L10 counter configured to give output signals corresponding to the upper-left-4 and upper-left-8 pixels. The compartors U16 and U7 may be fabricated from commonly available from 74LS85 integrated circuit chips. Likewise, the multiplexers U32, U33, and U34 and U44, U45 and U46 comprise standard 74LS298 multiplexer chips controlled by the microprocessor 354 in accordance with the source code attached hereto. Likewise the 256×1 RAM and 64×1 RAM for storage of the 8-same and 4-same information are 74S201 dynamic RAM chips in the preferred embodiment. The integrated circuits U38 through U41 and U49 through U52 which comprise the 1K by 16 buffer RAMS are each number 9150 dynamic RAM chips. The look up tables of integrated circuits U42, U43 and U53 and U54 comprise PROM chips from AMD designated AM27512, programmed in accordance with the listing of Appendix C and the output codes shown in Appendix D. The main microprocessor 354 comprises an AMD 29117C microprocessor operated in a bit slice embodiment. The sequence 356 comprises an AMD 29PL141 programmed in accordance with the listing of Appendix A as a state machine. The microcode conversion chips of U56, U57, and U59 and U61 comprise AMD 27535 integrated circuits while U62 comprises a 74S174 integrated circuit.

The output of the microprocessor 354 is supplied in the preferred embodiment to a dual port bus arbiter and ultimately provided to an appropriate VME bus for storage in selected memory medium. Signal processing past the microprocessor stage of the compressed data is deemed to be within the skill of those skilled in the art. Further description herein is not deemed necessary.

A preferred embodiment of the present invention has been described above. This description has been given by way of illustration only and not by way of limitation. Such modifications and alterations as would be apparent to one of skill in the art and familiar with the teachings of this application should be deemed to fall within the spirit and scope of the present invention which invention is set forth with particularity in the appended claims. These claims should be properly viewed in conjunction with the foregoing description and in view of the relevant prior art.

APPENDIX A

```
Device (Am29pl141) " Plprog8.src Date: 7-17-87 "

Default = 0 ;
Define Z = T0 " Define tests "
 nstrp = T1
 eq8 = T2
 eq4 = T3
 pon = T4
 inwndw = T5
 pass = cc

"Labels for the outputs "
 askbus = C00#H
 Zero = 800#H
 One = 801#H
 Two = 802#H
 Three = 803#H
 Four = 804#H
 Five = 805#H
 Six = 806#H
 Seven  = 807#H
 Eight  = 808#H

 tstBPOS = 25#H "BOR1 W,D#4,TSTNR,R3 "
 tstSUM = 29#H "BOR1 W,D#5,TSTNR,R2 "

 rout0 = 09#H " Power-on inititalization "
 rout1 = 0A#H " Parameter loading "
 rout2 = 0B#H " New strip initialization "
 rout4 = 0C#H " Last strip termination "
 rout8 = 0D#H " Write data to RAM "
 rout7 = 0E#H " Read code from LUT ROM "
 routb = 26#H " append a 0 for unequal 8 X 8 or 4 X 4 "
 routd = 27#H " 4 X 4 same "
 route = 28#H " Write data to ram "
 routf = 2b#H " 8 X 8 same "

 ld4blk = 0F#H "BOR2 W,D#2,LD2NR,R5 "
 ld2blk = 10#H "BOR2 W,D#2,LD2NR,R6 "
 dec4blk = 11#H "BOR2 W,D#0,S2NR,R5 "
 dec2blk = 12#H "BOR2 W,D#0,S2NR,R6 "

 accad1 = 13#H " BONR W,D#0,LD2NA "
 accad4 = 14#H " BONR W,D#2,LD2NA "
 accad16 = 15#H " BONR W,D#4,LD2NA "


 immeX = 16#H "IMME B#XXXXXXXXXXXXXXXX "
 immsk = 17#H "IMME H#001F "
 nop = 18#H
 off = 18#H
```

```
rotr10   = 19#H  "ROTR1 W,H#X,RTRA,R10 "
rotr11   = 1A#H  "ROTR1 W,H#X,RTRA,R11 "
mergr11  = 1B#H  "ROTM W,H#X,MRAI,R11 "
mergr0   = 1C#H  "ROTM W,H#0,MARI,R0 "
mergr1   = 1D#H  "ROTM W,H#0,MARI,R1 "

rtra7    = 1E#H  "ROTR1 W,H#4,RTRA,R7 "
movry3   = 1F#H  "SOR W,MOVE,SORY,R3 & BITPOS "
movar3   = 20#H  "SOR W,MOVE,SOAR,R3 & BITPOS "
movar0   = 21#H  "SOR W,MOVE,SOAR,R0 "
movar1   = 22#H  "SOR W,MOVE,SOAR,R1 "

xoraa15  = 23#H  "TOR1 W,TORAA,EXOR,R15 "
andria2  = 24#H  "TOR1 W,TORIA,AND,R2 "
incBPOS  = 2A#H; "SOR W,INC,SORR,R3 increment bit pos "

begin
Start: nop, if ( inwndw ) then goto pl ( Dostrp ) ;
 rout1, if ( pass ) then call pl ( cntr1 ), nested ;
 nop, if ( pass ) then goto pl ( Start ) ;
Dostrp: nop, if ( not nstrp ) then goto pl ( Dostrp ) ;
 rout2, if ( pass ) then call pl ( cntr ), nested ;

" See if 8 X 8 block has equal data. If equal then append the data.
   If not equal then check to see if the 4 X 4 block is the same. "
Chk8eq: routb, if ( not eq8 ) then goto pl ( Ck4blk ) ;
 routf, if ( pass ) then call pl ( Cntr1 ), nested ;
 nop, if ( pass ) then call pl ( Appl), nested ;

"See if the end of the strip has been reached "
Chkend: rtra7, continue ;
 xoraa15,continue ;
 nop, if ( not Z ) then goto pl ( Chk8eq ) ;
Strpdn: rout4, if ( pass ) then call pl ( cntr ), nested ;
 nop, if ( pass ) then goto pl ( Start ) ;

" See if 4 X 4 block has equal data. If equal then append the data.
   If not equal then check to see if the 2 X 2 block is the same. "
Ck4blk: ld4blk, if ( pass ) then call pl ( cntr2 ) ;
 route, if ( not Z ) then call pl ( cntr ) ;
Loop4: routb, if ( not eq4 ) then goto pl ( Ck2blk ) ;
 routd,  if ( pass ) then call pl ( Cntr1 ), nested ;
 nop, if ( pass ) then call pl ( Appl), nested ;
Ck4dne: dec4blk,continue ;
 nop, if ( not Z ) then goto pl ( Loop4 ) ;
 nop, if ( pass ) then goto pl ( Chkend ) ;

"If down to the 2 X 2 block level, need to append data four time,
 because there are four 2 X 2 blocks in a 4 X 4 block. "
Ck2blk: ld2blk, if ( pass ) then call pl ( cntr2 ) ;
 route, if ( not Z ) then call pl ( cntr ) ;
Loop2: accad1, if ( pass ) then call pl ( Append ), nested ;
" Decrement the 2 X 2 block count and see if done. "
 dec2blk,continue ;
 nop, if ( not Z ) then goto pl ( LOOP2 ) ;
 nop, if ( pass ) then goto pl ( CK4DNE ) ;

" Routine to append new data to old "

"first do routine 7 which loads the data from the ROM "
Append: rout7, if ( pass ) then call pl ( cntr1 ), nested ;

" There are four cases: if bitposition is > 16 then it is the
    upper two cases. "
```

```
Appl: movry3, continue ;
 tstBPOS,continue ;
 rotrl0, if ( not Z ) then goto pl ( Ucase ) ;

"Do the cases where bitpos < 16 "
 mergr0, continue ;
 immeX, continue ;
 mergr11,continue ;
 immeX, continue ;
 tstSUM, continue ;
 movAR1, if ( Z ) then goto pl ( Posadj ) ;
 rout8, if ( pass ) then call pl ( cntr ), nested ;
 rotrl1, continue ;
 movAR0, if ( pass ) then goto pl ( Posadj ) ;

" Do the cases where bitpos > 16 "
Ucase: mergr1, continue ;
 immeX, continue ;
 tstSUM, continue ;
 nop, if ( Z ) then goto pl ( Posadj ) ;
 mergr11,continue ;
 immeX, continue ;
 rout8, if ( pass ) then call pl ( cntr ), nested ;
 movar0, continue ;
 rotrl1, continue ;
 movar1, continue ;
"After merging the new data readjust the value of the bit position.
Posadj: andria2,continue ;
 immsk, continue ;
 movar3, if ( pass ) then ret, nested ;

" This the subroutine cntr "
cntr: askbus, if ( not pon ) then goto pl ( cntr ) ;
cntr1: zero, continue ;
 One, continue ;
 Two, continue ;
 Three, continue ;
 four, continue ;
 Five, continue ;
 Six, continue ;
cntr2: Seven, continue ;
 Eight, if ( pass ) then ret, nested ;

"Go to the start on power up. "
63#d: off, if ( pass ) then goto pl ( Start ) ;
end .
```

APPENDIX B

```
;PCOMP1.SRC
;MICROCODE DATE 7-29-87
;
;
POR: NOP   & ROMHI  ;-R00-
PARARD: NOP   & ROMHI  ;-R01-
NUSTRP: NOP   & ROMHI  ;-R02-
 NOP   & ROMHI  ;003
LSTRIT: NOP   & ROMHI  ;-R04-
 NOP   & ROMHI  ;005
 NOP   & ROMHI  ;006
ROMRD: NOP   & ROMHI  ;-R07-
```

```
DOWRIT: NOP   & ROMHI  ;-R08-
 NOP   & ROMHI  ;009
 NOP   & ROMHI  ;00A
APP04: NOP   & ROMHI  ;-R0B-
 NOP   & ROMHI  ;00C
SAME4: NOP   & ROMHI  ;-R0D-
DOWRT1: NOP   & ROMHI  ;-R0E-
SAME8: NOP   & ROMHI  ;-R0F-
 ;
 SOR W,MOVE,SOZR,R0 & RSTRIP ;-R10-
 SOR W,MOVE,SOZR,R14   ;-R11-
 SOR W,INC,SORR,R13 & ADRL & RSTRIP ;-R12-SAVE HEADER PTR
 NOP      ;013
 SOR W,MOVE,SORY,R8 & ADRL  ;-R14-OUT ADDRESS
 NOP      ;015
 NOP      ;016
 SOR W,MOVE,SODR,R10 & ROMHI  ;-R17-READ HIGH LOCATION
 SOR W,MOVE,SORY,R8 & ADRL  ;-R18-OUT ADDRESS
 NOP      ;019
 NOP      ;01A
 NOP      ;-R1B-
 NOP      ;01C
 SOR W,MOVE,SODR,R10 & ROMHI  ;-R1D-READ HIGH LOCATION
 SOR W,MOVE,SORY,R8 & ADRL  ;-R1E-OUT ADDRESS
 SOR W,MOVE,SODR,R10 & ROMHI  ;-R1F-READ HIGH LOCATION
 ;
 SOR W,MOVE,SOZR,R1   ;-R20-
 SOR W,MOVE,SOZR,R15   ;-R21-
 SOR W,MOVE,SORY,R8 & DOLAT & PWR ;-R22-ADDRESS
 NOP      ;023
 SOR W,MOVE,SORY,R0 & DOLAT & PWR ;-R24-OUT HIGH DATA
 NOP      ;025
 NOP      ;026
 BOR1 W,D#5,RSTNR,R3   ;-R27-BIT-POS < 32
 SOR W,MOVE,SORY,R0 & DOLAT & PWR ;-R28-OUT HIGH DATA
 NOP      ;029
 NOP      ;02A
 NOP      ;-R2B-
 NOP      ;02C
 BOR1 W,D#15,SETNR,R10  ;-R2D-SET MS BIT TO 1
 SOR W,MOVE,SORY,R0 & DOLAT & PWR ;-R2E-OUT HIGH DATA
 BOR1 W,D#15,SETNR,R10  ;-R2F-SET MS BIT TO 1
 ;
 SOR W,MOVE,SOZR,R2   ;-R30-
 SOR W,MOVE,SODR,R16 & CLKSCL & ROE ;-R31-READ AND CLOCK SCALE
 ROTR1 W,H#4,RTRA,R14   ;-R32-VSTART X 2 TO ACC
 NOP      ;033
 SOR W,INC,SORR,R8 & ADRL  ;-R34-OUT ADDRESS
 NOP      ;035
 NOP      ;036
 TOR2 W,TODIR,AND,R2 & ROMLO  ;-R37-READ SIZE
 SOR W,MOVE,SOZR,R0   ;-R38-FLUSH R0
 NOP      ;039
 NOP      ;03A
 NOP      ;-R3B-
 NOP      ;03C
 BOR1 W,D#5,RSTNR,R3   ;-R3D-BIT-POS < 32
 SOR W,MOVE,SOZR,R0   ;-R3E-FLUSH R0
 BOR1 W,D#5,RSTNR,R3   ;-R3F-BIT-POS < 32
 ;
 SOR W,MOVE,SOZR,R3   ;-R40-
 SOR W,MOVE,SODR,R9 & SEG & ROE & RS0 ;-R41-READ SEG
 SOR W,MOVE,SOAR,R7 & PMUXL  ;-R42-SPTR = VSTART
```

```
NOP     ;043
SOR W,MOVE,SORY,R1 & DOLAT & PWR ;-R44-OUT LOW DATA
NOP     ;045
NOP     ;046
IMME H#001F  & ROMLO  ;-R47-
SOR W,INC,SORR,R8 & ADRL  ;-R48-NEXT ADDRESS
NOP     ;049
NOP     ;04A
NOP     ;-R4B-
NOP     ;04C
BOR2 W,D#2,A2NR,R7 & PMUXL  ;-R4D-SOURCE ADDR + 4
SOR W,INC,SORR,R8 & ADRL  ;-R4E-NEXT ADDRESS
BOR2 W,D#4,A2NR,R7 & PMUXL  ;-R4F-SOURCE ADDR + 16
;
SOR W,MOVE,SOZR,R8   ;-R50-
SOR B,MOVE,SODR,R14 & ROE & RS1 ;-R51-VSTART
SOR W,MOVE,SOZR,R0   ;-R52-ZERO REGISTERS
NOP     ;053
BOR2 W,H#4,LD2NR,R4 & ADRL  ;-R54-SAVE EOF PTR
NOP     ;055
NOP     ;056
SOR  W,MOVE,SODR,R11 & ROMLO  ;-R57-READ LOW LOCATION
SOR W,MOVE,SORY,R1 & DOLAT & PWR ;-R58-OUT LOW DATA
NOP     ;059
NOP     ;05A
NOP     ;-R5B-
NOP     ;05C
SOR W,MOVE,SORA,R3   ;-R5D-BIT-POS TO ACC
SOR W,MOVE,SORY,R1 & DOLAT & PWR ;-R5E-OUT LOW DATA
SOR W,MOVE,SORA,R3   ;-R5F-BIT-POS TO ACC
;
SOR W,MOVE,SOZR,R14   ;-R60-
SOR B,MOVE,SODR,R15 & ROE & RS1 & RS0 ;-R61-VEND
SOR W,MOVE,SOZR,R1   ;-R62-ZERO REGISTERS
NOP     ;063
SOR W,INC,SORR,R8 & DOLAT & PWR ;-R64-
NOP     ;065
NOP     ;066
TOR1 W,TORAR,ADD,R7 & PMUXL  ;-R67-NEW SOURCE ADDRESS
SOR W,INC,SORR,R8    ;-R68-INC ADDRESS
NOP     ;069
NOP     ;06A
BOR2 W,D#2,LD2NR,R5   ;-R6B-4 BLK CNT = 4
NOP     ;06C
TOR2 W,TOAIR,ADD,R2   ;-R6D-SUM = BIT-POS + 5
SOR W,INC,SORR,R8    ;-R6E-INC ADDRESS
TOR2 W,TOAIR,ADD,R2   ;-R6F-SUM = BIT-POS + 5
;
SOR W,MOVE,SOZR,R15   ;-R70-
BOR2 W,H#4,LD2NR,R13   ;-R71-HEADER PTR
SOR W,MOVE,SOZR,R3 & BITPOS ;-R72-BITPOS = 0
NOP     ;073
NOP     ;-R74-
NOP     ;075
NOP     ;076
SOR W,MOVE,SORA,R3   ;-R77-CALCULATE SUM
SOR W,MOVE,SORY,R3 & BITPOS ;-R78-REINSERT BITPOS
NOP     ;079
NOP     ;07A
SOR W,INC,SORR,R3   ;-R7B-INCREMENT BIT-POS
NOP     ;07C
IMME H#0005    ;-R7D-
BOR1 W,D#5,RSTNR,R3   ;-R7E-BIT-POS < 32
```

```
IMME H#0005    ;-R7F-
;
NOP      ;-R80-
BOR2 W,H#7,LD2NR,R8    ;-R81-SAVE ADDRESS POINTER
NOP      ;-R82-
NOP      ;083
NOP      ;-R84-
NOP      ;085
NOP      ;086
TOR1 W,TORAR,ADD,R2    ;-R87-
SOR W,MOVE,SOZR,R1    ;-R88-FLUSH R1
NOP      ;089
NOP      ;08A
BOR1 W,D#5,TSTNR,R3    ;-R8B-BITPOS > 32 ?
NOP      ;08C
SOR  W,MOVE,SOZR,R11    ;-R8D-LOW LOCATION = 0
SOR W,MOVE,SOZR,R1    ;-R8E-FLUSH R1
SOR  W,MOVE,SOZR,R11    ;-R8F-LOW LOCATION = 0
;
BOR2 W,D#4,LD2NR,R31 & BITPOS ;090
BOR2 W,D#4,LD2NR,R31 & BITPOS ;091
BOR2 W,D#4,LD2NR,R31 & BITPOS ;092
BOR2 W,D#4,LD2NR,R31 & BITPOS ;093
BOR2 W,D#4,LD2NR,R31 & BITPOS ;094
BOR2 W,D#4,LD2NR,R31 & BITPOS ;095
BOR2 W,D#4,LD2NR,R31 & BITPOS ;096
BOR2 W,D#4,LD2NR,R31 & BITPOS ;097
BOR2 W,D#4,LD2NR,R31 & BITPOS ;098
BOR2 W,D#4,LD2NR,R31 & BITPOS ;099
BOR2 W,D#4,LD2NR,R31 & BITPOS ;09A
BOR2 W,D#4,LD2NR,R31 & BITPOS ;09B
BOR2 W,D#4,LD2NR,R31 & BITPOS ;09C
BOR2 W,D#4,LD2NR,R31 & BITPOS ;09D
BOR2 W,D#4,LD2NR,R31 & BITPOS ;09E
BOR2 W,D#4,LD2NR,R31 & BITPOS ;09F
;
BOR2 W,D#0,LD2NR,R31 & BITPOS ;0A0
BOR2 W,D#0,LD2NR,R31 & BITPOS ;0A1
BOR2 W,D#0,LD2NR,R31 & BITPOS ;0A2
BOR2 W,D#0,LD2NR,R31 & BITPOS ;0A3
BOR2 W,D#0,LD2NR,R31 & BITPOS ;0A4
BOR2 W,D#0,LD2NR,R31 & BITPOS ;0A5
BOR2 W,D#0,LD2NR,R31 & BITPOS ;0A6
BOR2 W,D#0,LD2NR,R31 & BITPOS ;0A7
BOR2 W,D#0,LD2NR,R31 & BITPOS ;0A8
BOR2 W,D#0,LD2NR,R31 & BITPOS ;0A9
BOR2 W,D#0,LD2NR,R31 & BITPOS ;0AA
BOR2 W,D#0,LD2NR,R31 & BITPOS ;0AB
BOR2 W,D#0,LD2NR,R31 & BITPOS ;0AC
BOR2 W,D#0,LD2NR,R31 & BITPOS ;0AD
BOR2 W,D#0,LD2NR,R31 & BITPOS ;0AE
BOR2 W,D#0,LD2NR,R31 & BITPOS ;0AF
;
BOR2 W,D#1,LD2NR,R31 & BITPOS ;0B0
BOR2 W,D#1,LD2NR,R31 & BITPOS ;0B1
BOR2 W,D#1,LD2NR,R31 & BITPOS ;0B2
BOR2 W,D#1,LD2NR,R31 & BITPOS ;0B3
BOR2 W,D#1,LD2NR,R31 & BITPOS ;0B4
BOR2 W,D#1,LD2NR,R31 & BITPOS ;0B5
BOR2 W,D#1,LD2NR,R31 & BITPOS ;0B6
BOR2 W,D#1,LD2NR,R31 & BITPOS ;0B7
BOR2 W,D#1,LD2NR,R31 & BITPOS ;0B8
BOR2 W,D#1,LD2NR,R31 & BITPOS ;0B9
```

```
BOR2 W,D#1,LD2NR,R31 & BITPOS ;0BA
BOR2 W,D#1,LD2NR,R31 & BITPOS ;0BB
BOR2 W,D#1,LD2NR,R31 & BITPOS ;0BC
BOR2 W,D#1,LD2NR,R31 & BITPOS ;0BD
BOR2 W,D#1,LD2NR,R31 & BITPOS ;0BE
BOR2 W,D#1,LD2NR,R31 & BITPOS ;0BF
;
BOR2 W,D#2,LD2NR,R31 & BITPOS ;0C0
BOR2 W,D#2,LD2NR,R31 & BITPOS ;0C1
BOR2 W,D#2,LD2NR,R31 & BITPOS ;0C2
BOR2 W,D#2,LD2NR,R31 & BITPOS ;0C3
BOR2 W,D#2,LD2NR,R31 & BITPOS ;0C4
BOR2 W,D#2,LD2NR,R31 & BITPOS ;0C5
BOR2 W,D#2,LD2NR,R31 & BITPOS ;0C6
BOR2 W,D#2,LD2NR,R31 & BITPOS ;0C7
BOR2 W,D#2,LD2NR,R31 & BITPOS ;0C8
BOR2 W,D#2,LD2NR,R31 & BITPOS ;0C9
BOR2 W,D#2,LD2NR,R31 & BITPOS ;0CA
BOR2 W,D#2,LD2NR,R31 & BITPOS ;0CB
BOR2 W,D#2,LD2NR,R31 & BITPOS ;0CC
BOR2 W,D#2,LD2NR,R31 & BITPOS ;0CD
BOR2 W,D#2,LD2NR,R31 & BITPOS ;0CE
BOR2 W,D#2,LD2NR,R31 & BITPOS ;0CF
;
BOR2 W,D#3,LD2NR,R31 & BITPOS ;0D0
BOR2 W,D#3,LD2NR,R31 & BITPOS ;0D1
BOR2 W,D#3,LD2NR,R31 & BITPOS ;0D2
BOR2 W,D#3,LD2NR,R31 & BITPOS ;0D3
BOR2 W,D#3,LD2NR,R31 & BITPOS ;0D4
BOR2 W,D#3,LD2NR,R31 & BITPOS ;0D5
BOR2 W,D#3,LD2NR,R31 & BITPOS ;0D6
BOR2 W,D#3,LD2NR,R31 & BITPOS ;0D7
BOR2 W,D#3,LD2NR,R31 & BITPOS ;0D8
BOR2 W,D#3,LD2NR,R31 & BITPOS ;0D9
BOR2 W,D#3,LD2NR,R31 & BITPOS ;0DA
BOR2 W,D#3,LD2NR,R31 & BITPOS ;0DB
BOR2 W,D#3,LD2NR,R31 & BITPOS ;0DC
BOR2 W,D#3,LD2NR,R31 & BITPOS ;0DD
BOR2 W,D#3,LD2NR,R31 & BITPOS ;0DE
BOR2 W,D#3,LD2NR,R31 & BITPOS ;0DF
;
BOR2 W,D#3,LDC2NR,R31 & BITPOS & ROMHI ;0E0
BOR2 W,D#3,LDC2NR,R31 & BITPOS & ROMHI ;0E1
BOR2 W,D#3,LDC2NR,R31 & BITPOS & ROMHI ;0E2
BOR2 W,D#3,LDC2NR,R31 & BITPOS & ROMHI ;0E3
BOR2 W,D#3,LDC2NR,R31 & BITPOS & ROMHI ;0E4
BOR2 W,D#3,LDC2NR,R31 & BITPOS & ROMHI ;0E5
BOR2 W,D#3,LDC2NR,R31 & BITPOS & ROMHI ;0E6
BOR2 W,D#3,LDC2NR,R31 & BITPOS & ROMHI ;0E7
BOR2 W,D#3,LDC2NR,R31 & BITPOS & ROMHI ;0E8
BOR2 W,D#3,LDC2NR,R31 & BITPOS & ROMHI ;0E9
BOR2 W,D#3,LDC2NR,R31 & BITPOS & ROMHI ;0EA
BOR2 W,D#3,LDC2NR,R31 & BITPOS & ROMHI ;0EB
BOR2 W,D#3,LDC2NR,R31 & BITPOS & ROMHI ;0EC
BOR2 W,D#3,LDC2NR,R31 & BITPOS & ROMHI ;0ED
BOR2 W,D#3,LDC2NR,R31 & BITPOS & ROMHI ;0EE
BOR2 W,D#3,LDC2NR,R31 & BITPOS & ROMHI ;0EF
;
BOR2 W,D#2,LD2NR,R5 ;0F0
BOR2 W,D#2,LD2NR,R5 ;0F1
BOR2 W,D#2,LD2NR,R5 ;0F2
BOR2 W,D#2,LD2NR,R5 ;0F3
BOR2 W,D#2,LD2NR,R5 ;0F4
```

```
BOR2 W,D#2,LD2NR,R5 ;0F5
BOR2 W,D#2,LD2NR,R5 ;0F6
BOR2 W,D#2,LD2NR,R5 ;0F7
BOR2 W,D#2,LD2NR,R5 ;0F8
BOR2 W,D#2,LD2NR,R5 ;0F9
BOR2 W,D#2,LD2NR,R5 ;0FA
BOR2 W,D#2,LD2NR,R5 ;0FB
BOR2 W,D#2,LD2NR,R5 ;0FC
BOR2 W,D#2,LD2NR,R5 ;0FD
BOR2 W,D#2,LD2NR,R5 ;0FE
BOR2 W,D#2,LD2NR,R5 ;0FF
;
BOR2 W,D#2,LD2NR,R6 ;100
BOR2 W,D#2,LD2NR,R6 ;101
BOR2 W,D#2,LD2NR,R6 ;102
BOR2 W,D#2,LD2NR,R6 ;103
BOR2 W,D#2,LD2NR,R6 ;104
BOR2 W,D#2,LD2NR,R6 ;105
BOR2 W,D#2,LD2NR,R6 ;106
BOR2 W,D#2,LD2NR,R6 ;107
BOR2 W,D#2,LD2NR,R6 ;108
BOR2 W,D#2,LD2NR,R6 ;109
BOR2 W,D#2,LD2NR,R6 ;10A
BOR2 W,D#2,LD2NR,R6 ;10B
BOR2 W,D#2,LD2NR,R6 ;10C
BOR2 W,D#2,LD2NR,R6 ;10D
BOR2 W,D#2,LD2NR,R6 ;10E
BOR2 W,D#2,LD2NR,R6 ;10F
;
BOR2 W,D#0,S2NR,R5 ;110
BOR2 W,D#0,S2NR,R5 ;111
BOR2 W,D#0,S2NR,R5 ;112
BOR2 W,D#0,S2NR,R5 ;113
BOR2 W,D#0,S2NR,R5 ;114
BOR2 W,D#0,S2NR,R5 ;115
BOR2 W,D#0,S2NR,R5 ;116
BOR2 W,D#0,S2NR,R5 ;117
BOR2 W,D#0,S2NR,R5 ;118
BOR2 W,D#0,S2NR,R5 ;119
BOR2 W,D#0,S2NR,R5 ;11A
BOR2 W,D#0,S2NR,R5 ;11B
BOR2 W,D#0,S2NR,R5 ;11C
BOR2 W,D#0,S2NR,R5 ;11D
BOR2 W,D#0,S2NR,R5 ;11E
BOR2 W,D#0,S2NR,R5 ;11F
;
BOR2 W,D#0,S2NR,R6 ;120
BOR2 W,D#0,S2NR,R6 ;121
BOR2 W,D#0,S2NR,R6 ;122
BOR2 W,D#0,S2NR,R6 ;123
BOR2 W,D#0,S2NR,R6 ;124
BOR2 W,D#0,S2NR,R6 ;125
BOR2 W,D#0,S2NR,R6 ;126
BOR2 W,D#0,S2NR,R6 ;127
BOR2 W,D#0,S2NR,R6 ;128
BOR2 W,D#0,S2NR,R6 ;129
BOR2 W,D#0,S2NR,R6 ;12A
BOR2 W,D#0,S2NR,R6 ;12B
BOR2 W,D#0,S2NR,R6 ;12C
BOR2 W,D#0,S2NR,R6 ;12D
BOR2 W,D#0,S2NR,R6 ;12E
BOR2 W,D#0,S2NR,R6 ;12F
;
```

```
BONR W,D#0,LD2NA ;130
BONR W,D#0,LD2NA ;131
BONR W,D#0,LD2NA ;132
BONR W,D#0,LD2NA ;133
BONR W,D#0,LD2NA ;134
BONR W,D#0,LD2NA ;135
BONR W,D#0,LD2NA ;136
BONR W,D#0,LD2NA ;137
BONR W,D#0,LD2NA ;138
BONR W,D#0,LD2NA ;139
BONR W,D#0,LD2NA ;13A
BONR W,D#0,LD2NA ;13B
BONR W,D#0,LD2NA ;13C
BONR W,D#0,LD2NA ;13D
BONR W,D#0,LD2NA ;13E
BONR W,D#0,LD2NA ;13F
;
BONR W,D#2,LD2NA ;140
BONR W,D#2,LD2NA ;141
BONR W,D#2,LD2NA ;142
BONR W,D#2,LD2NA ;143
BONR W,D#2,LD2NA ;144
BONR W,D#2,LD2NA ;145
BONR W,D#2,LD2NA ;146
BONR W,D#2,LD2NA ;147
BONR W,D#2,LD2NA ;148
BONR W,D#2,LD2NA ;149
BONR W,D#2,LD2NA ;14A
BONR W,D#2,LD2NA ;14B
BONR W,D#2,LD2NA ;14C
BONR W,D#2,LD2NA ;14D
BONR W,D#2,LD2NA ;14E
BONR W,D#2,LD2NA ;14F
;
BONR W,D#4,LD2NA ;150
BONR W,D#4,LD2NA ;151
BONR W,D#4,LD2NA ;152
BONR W,D#4,LD2NA ;153
BONR W,D#4,LD2NA ;154
BONR W,D#4,LD2NA ;155
BONR W,D#4,LD2NA ;156
BONR W,D#4,LD2NA ;157
BONR W,D#4,LD2NA ;158
BONR W,D#4,LD2NA ;159
BONR W,D#4,LD2NA ;15A
BONR W,D#4,LD2NA ;15B
BONR W,D#4,LD2NA ;15C
BONR W,D#4,LD2NA ;15D
BONR W,D#4,LD2NA ;15E
BONR W,D#4,LD2NA ;15F
;
IMME B#1111111111111111 ;160
IMME B#0111111111111111 ;161
IMME B#0011111111111111 ;162
IMME B#0001111111111111 ;163
IMME B#0000111111111111 ;164
IMME B#0000011111111111 ;165
IMME B#0000001111111111 ;166
```

```
IMME B#0000000111111111 ;167
IMME B#0000000011111111 ;168
IMME B#0000000001111111 ;169
IMME B#0000000000111111 ;16A
IMME B#0000000000011111 ;16B
IMME B#0000000000001111 ;16C
IMME B#0000000000000111 ;16D
IMME B#0000000000000011 ;16E
IMME B#0000000000000001 ;16F
;
IMME H#001F  ;170
IMME H#001F  ;171
IMME H#001F  ;172
IMME H#001F  ;173
IMME H#001F  ;174
IMME H#001F  ;175
IMME H#001F  ;176
IMME H#001F  ;177
IMME H#001F  ;178
IMME H#001F  ;179
IMME H#001F  ;17A
IMME H#001F  ;17B
IMME H#001F  ;17C
IMME H#001F  ;17D
IMME H#001F  ;17E
IMME H#001F  ;17F
;
NOP   ;180
NOP   ;181
NOP   ;182
NOP   ;183
NOP   ;184
NOP   ;185
NOP   ;186
NOP   ;187
NOP   ;188
NOP   ;189
NOP   ;18A
NOP   ;18B
NOP   ;18C
NOP   ;18D
NOP   ;18E
NOP   ;18F
;
ROTR1 W,H#0,RTRA,R10 ;190
ROTR1 W,H#F,RTRA,R10 ;191
ROTR1 W,H#E,RTRA,R10 ;192
ROTR1 W,H#D,RTRA,R10 ;193
ROTR1 W,H#C,RTRA,R10 ;194
ROTR1 W,H#B,RTRA,R10 ;195
ROTR1 W,H#A,RTRA,R10 ;196
ROTR1 W,H#9,RTRA,R10 ;197
ROTR1 W,H#8,RTRA,R10 ;198
ROTR1 W,H#7,RTRA,R10 ;199
ROTR1 W,H#6,RTRA,R10 ;19A
ROTR1 W,H#5,RTRA,R10 ;19B
ROTR1 W,H#4,RTRA,R10 ;19C
ROTR1 W,H#3,RTRA,R10 ;19D
ROTR1 W,H#2,RTRA,R10 ;19E
ROTR1 W,H#1,RTRA,R10 ;19F
;
ROTR1 W,H#0,RTRA,R11 ;1A0
ROTR1 W,H#F,RTRA,R11 ;1A1
```

```
ROTR1 W,H#E,RTRA,R11 ;1A2
ROTR1 W,H#D,RTRA,R11 ;1A3
ROTR1 W,H#C,RTRA,R11 ;1A4
ROTR1 W,H#B,RTRA,R11 ;1A5
ROTR1 W,H#A,RTRA,R11 ;1A6
ROTR1 W,H#9,RTRA,R11 ;1A7
ROTR1 W,H#8,RTRA,R11 ;1A8
ROTR1 W,H#7,RTRA,R11 ;1A9
ROTR1 W,H#6,RTRA,R11 ;1AA
ROTR1 W,H#5,RTRA,R11 ;1AB
ROTR1 W,H#4,RTRA,R11 ;1AC
ROTR1 W,H#3,RTRA,R11 ;1AD
ROTR1 W,H#2,RTRA,R11 ;1AE
ROTR1 W,H#1,RTRA,R11 ;1AF
;
ROTM W,H#0,MRAI,R11 ;1B0
ROTM W,H#F,MRAI,R11 ;1B1
ROTM W,H#E,MRAI,R11 ;1B2
ROTM W,H#D,MRAI,R11 ;1B3
ROTM W,H#C,MRAI,R11 ;1B4
ROTM W,H#B,MRAI,R11 ;1B5
ROTM W,H#A,MRAI,R11 ;1B6
ROTM W,H#9,MRAI,R11 ;1B7
ROTM W,H#8,MRAI,R11 ;1B8
ROTM W,H#7,MRAI,R11 ;1B9
ROTM W,H#6,MRAI,R11 ;1BA
ROTM W,H#5,MRAI,R11 ;1BB
ROTM W,H#4,MRAI,R11 ;1BC
ROTM W,H#3,MRAI,R11 ;1BD
ROTM W,H#2,MRAI,R11 ;1BE
ROTM W,H#1,MRAI,R11 ;1BF
;
ROTM W,H#0,MARI,R0 ;1C0
ROTM W,H#0,MARI,R0 ;1C1
ROTM W,H#0,MARI,R0 ;1C2
ROTM W,H#0,MARI,R0 ;1C3
ROTM W,H#0,MARI,R0 ;1C4
ROTM W,H#0,MARI,R0 ;1C5
ROTM W,H#0,MARI,R0 ;1C6
ROTM W,H#0,MARI,R0 ;1C7
ROTM W,H#0,MARI,R0 ;1C8
ROTM W,H#0,MARI,R0 ;1C9
ROTM W,H#0,MARI,R0 ;1CA
ROTM W,H#0,MARI,R0 ;1CB
ROTM W,H#0,MARI,R0 ;1CC
ROTM W,H#0,MARI,R0 ;1CD
ROTM W,H#0,MARI,R0 ;1CE
ROTM W,H#0,MARI,R0 ;1CF
;
ROTM W,H#0,MARI,R1 ;1D0
ROTM W,H#0,MARI,R1 ;1D1
ROTM W,H#0,MARI,R1 ;1D2
ROTM W,H#0,MARI,R1 ;1D3
ROTM W,H#0,MARI,R1 ;1D4
ROTM W,H#0,MARI,R1 ;1D5
ROTM W,H#0,MARI,R1 ;1D6
ROTM W,H#0,MARI,R1 ;1D7
ROTM W,H#0,MARI,R1 ;1D8
ROTM W,H#0,MARI,R1 ;1D9
ROTM W,H#0,MARI,R1 ;1DA
ROTM W,H#0,MARI,R1 ;1DB
ROTM W,H#0,MARI,R1 ;1DC
ROTM W,H#0,MARI,R1 ;1DD
```

```
ROTM W,H#0,MARI,R1 ;1DE
ROTM W,H#0,MARI,R1 ;1DF
;
ROTR1 W,H#4,RTRA,R15 ;1E0
ROTR1 W,H#4,RTRA,R15 ;1E1
ROTR1 W,H#4,RTRA,R15 ;1E2
ROTR1 W,H#4,RTRA,R15 ;1E3
ROTR1 W,H#4,RTRA,R15 ;1E4
ROTR1 W,H#4,RTRA,R15 ;1E5
ROTR1 W,H#4,RTRA,R15 ;1E6
ROTR1 W,H#4,RTRA,R15 ;1E7
ROTR1 W,H#4,RTRA,R15 ;1E8
ROTR1 W,H#4,RTRA,R15 ;1E9
ROTR1 W,H#4,RTRA,R15 ;1EA
ROTR1 W,H#4,RTRA,R15 ;1EB
ROTR1 W,H#4,RTRA,R15 ;1EC
ROTR1 W,H#4,RTRA,R15 ;1ED
ROTR1 W,H#4,RTRA,R15 ;1EE
ROTR1 W,H#4,RTRA,R15 ;1EF
;
SOR W,MOVE,SORY,R3 & BITPOS ;1F0
SOR W,MOVE,SORY,R3 & BITPOS ;1F1
SOR W,MOVE,SORY,R3 & BITPOS ;1F2
SOR W,MOVE,SORY,R3 & BITPOS ;1F3
SOR W,MOVE,SORY,R3 & BITPOS ;1F4
SOR W,MOVE,SORY,R3 & BITPOS ;1F5
SOR W,MOVE,SORY,R3 & BITPOS ;1F6
SOR W,MOVE,SORY,R3 & BITPOS ;1F7
SOR W,MOVE,SORY,R3 & BITPOS ;1F8
SOR W,MOVE,SORY,R3 & BITPOS ;1F9
SOR W,MOVE,SORY,R3 & BITPOS ;1FA
SOR W,MOVE,SORY,R3 & BITPOS ;1FB
SOR W,MOVE,SORY,R3 & BITPOS ;1FC
SOR W,MOVE,SORY,R3 & BITPOS ;1FD
SOR W,MOVE,SORY,R3 & BITPOS ;1FE
SOR W,MOVE,SORY,R3 & BITPOS ;1FF
;
SOR W,MOVE,SOAR,R3 & BITPOS ;200
SOR W,MOVE,SOAR,R3 & BITPOS ;201
SOR W,MOVE,SOAR,R3 & BITPOS ;202
SOR W,MOVE,SOAR,R3 & BITPOS ;203
SOR W,MOVE,SOAR,R3 & BITPOS ;204
SOR W,MOVE,SOAR,R3 & BITPOS ;205
SOR W,MOVE,SOAR,R3 & BITPOS ;206
SOR W,MOVE,SOAR,R3 & BITPOS ;207
SOR W,MOVE,SOAR,R3 & BITPOS ;208
SOR W,MOVE,SOAR,R3 & BITPOS ;209
SOR W,MOVE,SOAR,R3 & BITPOS ;20A
SOR W,MOVE,SOAR,R3 & BITPOS ;20B
SOR W,MOVE,SOAR,R3 & BITPOS ;20C
SOR W,MOVE,SOAR,R3 & BITPOS ;20D
SOR W,MOVE,SOAR,R3 & BITPOS ;20E
SOR W,MOVE,SOAR,R3 & BITPOS ;20F
;
SOR W,MOVE,SOAR,R0 ;210
SOR W,MOVE,SOAR,R0 ;211
SOR W,MOVE,SOAR,R0 ;212
SOR W,MOVE,SOAR,R0 ;213
SOR W,MOVE,SOAR,R0 ;214
SOR W,MOVE,SOAR,R0 ;215
SOR W,MOVE,SOAR,R0 ;216
SOR W,MOVE,SOAR,R0 ;217
SOR W,MOVE,SOAR,R0 ;218
```

```
SOR W,MOVE,SOAR,R0 ;219
SOR W,MOVE,SOAR,R0 ;21A
SOR W,MOVE,SOAR,R0 ;21B
SOR W,MOVE,SOAR,R0 ;21C
SOR W,MOVE,SOAR,R0 ;21D
SOR W,MOVE,SOAR,R0 ;21E
SOR W,MOVE,SOAR,R0 ;21F
;
SOR W,MOVE,SOAR,R1 ;220
SOR W,MOVE,SOAR,R1 ;221
SOR W,MOVE,SOAR,R1 ;222
SOR W,MOVE,SOAR,R1 ;223
SOR W,MOVE,SOAR,R1 ;224
SOR W,MOVE,SOAR,R1 ;225
SOR W,MOVE,SOAR,R1 ;226
SOR W,MOVE,SOAR,R1 ;227
SOR W,MOVE,SOAR,R1 ;228
SOR W,MOVE,SOAR,R1 ;229
SOR W,MOVE,SOAR,R1 ;22A
SOR W,MOVE,SOAR,R1 ;22B
SOR W,MOVE,SOAR,R1 ;22C
SOR W,MOVE,SOAR,R1 ;22D
SOR W,MOVE,SOAR,R1 ;22E
SOR W,MOVE,SOAR,R1 ;22F
;
TOR1 W,TORAA,EXOR,R7 ;230
TOR1 W,TORAA,EXOR,R7 ;231
TOR1 W,TORAA,EXOR,R7 ;232
TOR1 W,TORAA,EXOR,R7 ;233
TOR1 W,TORAA,EXOR,R7 ;234
TOR1 W,TORAA,EXOR,R7 ;235
TOR1 W,TORAA,EXOR,R7 ;236
TOR1 W,TORAA,EXOR,R7 ;237
TOR1 W,TORAA,EXOR,R7 ;238
TOR1 W,TORAA,EXOR,R7 ;239
TOR1 W,TORAA,EXOR,R7 ;23A
TOR1 W,TORAA,EXOR,R7 ;23B
TOR1 W,TORAA,EXOR,R7 ;23C
TOR1 W,TORAA,EXOR,R7 ;23D
TOR1 W,TORAA,EXOR,R7 ;23E
TOR1 W,TORAA,EXOR,R7 ;23F
;
TOR1 W,TORIA,AND,R2 ;240
TOR1 W,TORIA,AND,R2 ;241
TOR1 W,TORIA,AND,R2 ;242
TOR1 W,TORIA,AND,R2 ;243
TOR1 W,TORIA,AND,R2 ;244
TOR1 W,TORIA,AND,R2 ;245
TOR1 W,TORIA,AND,R2 ;246
TOR1 W,TORIA,AND,R2 ;247
TOR1 W,TORIA,AND,R2 ;248
TOR1 W,TORIA,AND,R2 ;249
TOR1 W,TORIA,AND,R2 ;24A
TOR1 W,TORIA,AND,R2 ;24B
TOR1 W,TORIA,AND,R2 ;24C
TOR1 W,TORIA,AND,R2 ;24D
TOR1 W,TORIA,AND,R2 ;24E
TOR1 W,TORIA,AND,R2 ;24F
;
BOR1 W,D#4,TSTNR,R3 ;250
BOR1 W,D#4,TSTNR,R3 ;251
BOR1 W,D#4,TSTNR,R3 ;252
BOR1 W,D#4,TSTNR,R3 ;253
```

```
BOR1 W,D#4,TSTNR,R3 ;254
BOR1 W,D#4,TSTNR,R3 ;255
BOR1 W,D#4,TSTNR,R3 ;256
BOR1 W,D#4,TSTNR,R3 ;257
BOR1 W,D#4,TSTNR,R3 ;258
BOR1 W,D#4,TSTNR,R3 ;259
BOR1 W,D#4,TSTNR,R3 ;25A
BOR1 W,D#4,TSTNR,R3 ;25B
BOR1 W,D#4,TSTNR,R3 ;25C
BOR1 W,D#4,TSTNR,R3 ;25D
BOR1 W,D#4,TSTNR,R3 ;25E
BOR1 W,D#4,TSTNR,R3 ;25F
;
BOR2 W,D#2,LDC2NR,R31 & BITPOS ;260
BOR2 W,D#2,LDC2NR,R31 & BITPOS ;261
BOR2 W,D#2,LDC2NR,R31 & BITPOS ;262
BOR2 W,D#2,LDC2NR,R31 & BITPOS ;263
BOR2 W,D#2,LDC2NR,R31 & BITPOS ;264
BOR2 W,D#2,LDC2NR,R31 & BITPOS ;265
BOR2 W,D#2,LDC2NR,R31 & BITPOS ;266
BOR2 W,D#2,LDC2NR,R31 & BITPOS ;267
BOR2 W,D#2,LDC2NR,R31 & BITPOS ;268
BOR2 W,D#2,LDC2NR,R31 & BITPOS ;269
```

APPENDIX C

```
BOR2 W,D#2,LDC2NR,R31 & BITPOS ;26A
BOR2 W,D#2,LDC2NR,R31 & BITPOS ;26B
BOR2 W,D#2,LDC2NR,R31 & BITPOS ;26C
BOR2 W,D#2,LDC2NR,R31 & BITPOS ;26D
BOR2 W,D#2,LDC2NR,R31 & BITPOS ;26E
BOR2 W,D#2,LDC2NR,R31 & BITPOS ;26F
;
BOR2 W,D#1,LDC2NR,R31 & BITPOS ;270
BOR2 W,D#1,LDC2NR,R31 & BITPOS ;271
BOR2 W,D#1,LDC2NR,R31 & BITPOS ;272
BOR2 W,D#1,LDC2NR,R31 & BITPOS ;273
BOR2 W,D#1,LDC2NR,R31 & BITPOS ;274
BOR2 W,D#1,LDC2NR,R31 & BITPOS ;275
BOR2 W,D#1,LDC2NR,R31 & BITPOS ;276
BOR2 W,D#1,LDC2NR,R31 & BITPOS ;277
BOR2 W,D#1,LDC2NR,R31 & BITPOS ;278
BOR2 W,D#1,LDC2NR,R31 & BITPOS ;279
BOR2 W,D#1,LDC2NR,R31 & BITPOS ;27A
BOR2 W,D#1,LDC2NR,R31 & BITPOS ;27B
BOR2 W,D#1,LDC2NR,R31 & BITPOS ;27C
BOR2 W,D#1,LDC2NR,R31 & BITPOS ;27D
BOR2 W,D#1,LDC2NR,R31 & BITPOS ;27E
BOR2 W,D#1,LDC2NR,R31 & BITPOS ;27F
;
BOR2 W,D#0,LDC2NR,R31 & BITPOS ;280
BOR2 W,D#0,LDC2NR,R31 & BITPOS ;281
BOR2 W,D#0,LDC2NR,R31 & BITPOS ;282
BOR2 W,D#0,LDC2NR,R31 & BITPOS ;283
BOR2 W,D#0,LDC2NR,R31 & BITPOS ;284
BOR2 W,D#0,LDC2NR,R31 & BITPOS ;285
BOR2 W,D#0,LDC2NR,R31 & BITPOS ;286
BOR2 W,D#0,LDC2NR,R31 & BITPOS ;287
BOR2 W,D#0,LDC2NR,R31 & BITPOS ;288
BOR2 W,D#0,LDC2NR,R31 & BITPOS ;289
BOR2 W,D#0,LDC2NR,R31 & BITPOS ;28A
BOR2 W,D#0,LDC2NR,R31 & BITPOS ;28B
```

```
BOR2 W,D#0,LDC2NR,R31 & BITPOS  ;28C
BOR2 W,D#0,LDC2NR,R31 & BITPOS  ;28D
BOR2 W,D#0,LDC2NR,R31 & BITPOS  ;28E
BOR2 W,D#0,LDC2NR,R31 & BITPOS  ;28F
;
BOR1 W,D#5,TSTNR,R2  ;290
BOR1 W,D#5,TSTNR,R2  ;291
BOR1 W,D#5,TSTNR,R2  ;292
BOR1 W,D#5,TSTNR,R2  ;293
BOR1 W,D#5,TSTNR,R2  ;294
BOR1 W,D#5,TSTNR,R2  ;295
BOR1 W,D#5,TSTNR,R2  ;296
BOR1 W,D#5,TSTNR,R2  ;297
BOR1 W,D#5,TSTNR,R2  ;298
BOR1 W,D#5,TSTNR,R2  ;299
BOR1 W,D#5,TSTNR,R2  ;29A
BOR1 W,D#5,TSTNR,R2  ;29B
BOR1 W,D#5,TSTNR,R2  ;29C
BOR1 W,D#5,TSTNR,R2  ;29D
BOR1 W,D#5,TSTNR,R2  ;29E
BOR1 W,D#5,TSTNR,R2  ;29F
;
SOR W,INC,SORR,R3  ;2A0
SOR W,INC,SORR,R3  ;2A1
SOR W,INC,SORR,R3  ;2A2
SOR W,INC,SORR,R3  ;2A3
SOR W,INC,SORR,R3  ;2A4
SOR W,INC,SORR,R3  ;2A5
SOR W,INC,SORR,R3  ;2A6
SOR W,INC,SORR,R3  ;2A7
SOR W,INC,SORR,R3  ;2A8
SOR W,INC,SORR,R3  ;2A9
SOR W,INC,SORR,R3  ;2AA
SOR W,INC,SORR,R3  ;2AB
SOR W,INC,SORR,R3  ;2AC
SOR W,INC,SORR,R3  ;2AD
SOR W,INC,SORR,R3  ;2AE
SOR W,INC,SORR,R3  ;2AF
;
BOR2 W,D#4,LDC2NR,R31 & BITPOS  ;2B0
BOR2 W,D#4,LDC2NR,R31 & BITPOS  ;2B1
BOR2 W,D#4,LDC2NR,R31 & BITPOS  ;2B2
BOR2 W,D#4,LDC2NR,R31 & BITPOS  ;2B3
BOR2 W,D#4,LDC2NR,R31 & BITPOS  ;2B4
BOR2 W,D#4,LDC2NR,R31 & BITPOS  ;2B5
BOR2 W,D#4,LDC2NR,R31 & BITPOS  ;2B6
BOR2 W,D#4,LDC2NR,R31 & BITPOS  ;2B7
BOR2 W,D#4,LDC2NR,R31 & BITPOS  ;2B8
BOR2 W,D#4,LDC2NR,R31 & BITPOS  ;2B9
BOR2 W,D#4,LDC2NR,R31 & BITPOS  ;2BA
BOR2 W,D#4,LDC2NR,R31 & BITPOS  ;2BB
BOR2 W,D#4,LDC2NR,R31 & BITPOS  ;2BC
BOR2 W,D#4,LDC2NR,R31 & BITPOS  ;2BD
BOR2 W,D#4,LDC2NR,R31 & BITPOS  ;2BE
BOR2 W,D#4,LDC2NR,R31 & BITPOS  ;2BF
```

APPENDIX C

```
#define THRESHOLD      1
#define unchar unsigned char
#define uint unsigned int
#define ushort unsigned short
#include <\lc\include\stdio.h>
#include <\lc\include\ctype.h>
```

```
static  unchar  cnt[16];
static  uint     result[65536];
unchar  lower_left, upper_left, lower_right, upper_right;
struct  {
        ushort  len;
         uint    code
} quantized [31] = {
        0,      0,              /* non-existing case */
        0,      0,              /* non-existing case */
        2,      0,              /* +2   */
        3,      4,              /* +3   */
        4,      12,             /* +4   */
        7,      112,            /* +5   */
        7,      112,            /* +6   */
        7,      112,            /* +7   */
        7,      112,            /* +8   */
        7,      112,            /* +9   */
        7,      112,            /* +10  */
        7,      112,            /* +11  */
        7,      112,            /* +12  */
        7,      112,            /* +13  */
        7,      112,            /* +14  */
        7,      112,            /* +15  */
        0,      0,              /* non-existing case */
        2,      1,              /* -2   */
        3,      5,              /* -3   */
        4,      13,             /* -4   */
        7,      112,            /* -5   */
        7,      112,            /* -6   */
        7,      112,            /* -7   */
        7,      112,            /* -8   */
        7,      112,            /* -9   */
        7,      112,            /* -10  */
        7,      112,            /* -11  */
        7,      112,            /* -12  */
        7,      112,            /* -13  */
        7,      112,            /* -14  */
        7,      112             /* -15  */
};

main ( argc, argv )
int   argc;
char *argv[];
{
        uint    i, fd;
        unchar  max, min, mode;
        ushort  j, nbytes, len;

        for ( i = 0; i < 65536; i++ ) {

                /* four 4-bit pixels make up 16-bit word */
                /* from left to right: LL, LR, UL, UR */

                cnt [ lower_left = ( i & 0xf000 ) >> 12 ]++;
                cnt [ lower_right = ( i & 0x0f00 ) >> 8 ]++;
                cnt [ upper_left = ( i & 0x00f0 ) >> 4 ]++;
                cnt [ upper_right = i & 0x000f ]++;

                /* first case -- they are the same */

                if ( lower_left == upper_left &&
```

```
      upper_left == lower_right &&
      lower_right == upper_right ) {
         result[i] = ( ( ( 1 << 4 ) | lower_right )
                     << 27 ) | 5;
} else

/* second case -- ( max - min ) <= threshold */

if ( ( max = find_max ( ) ) - ( min = find_min ( ) )
      <= THRESHOLD ) {
         result[i] = ( ( ( 1 << 4 ) | find_mode ( ) )
                     << 27 ) | 5;
} else {

/* third case -- break to two 1x2 blocks ( LL with LR
/*               and UL with UR ) and repeat max-min
/*               process again

         if ( lower_left == lower_right ||
              abs( lower_left - lower_right )
              <= THRESHOLD ) {
                 result[i] = ( ( 1 << 4 ) | lower_left
                 nbytes = 6;
         } else {
                 /* quantization process is needed */
                 if ( ( len =
                        quantized[ ( j =
                        adj ( lower_left - lower_right
                      != 7 ) {
                          result[i] = ( lower_left << 1
                                      quantized[j].code
                 } else {
                          result[i] = ( lower_left << 1
                                      quantized[j].code
                                      lower_right;
                 }
                 nbytes = 6 + len;
         }

         if ( upper_left == upper_right ||
              abs( upper_left - upper_right )
              <= THRESHOLD ) {
                 result[i] = ( result[i] << 5 ) |
                             ( 1 << 4 ) | upper_left;
                 nbytes += 5;

         } else {
                 /* quantization process is needed */
                 if ( ( len =
                        quantized[ ( j =
                        adj ( upper_left - upper_right
                      != 7 ) {
                          result[i] = ( result[i] << (
                                      | ( upper_left <<
                                      quantized[j].code
                 } else {
                          result[i] = ( result[i] << (
                                      | ( upper_left <<
                                      quantized[j].code
                                      upper_right;
                 }
                 nbytes += ( 5 + len );
```

```
                }

                result[i] = ( result[i] << ( 32 - nbytes ) )
        }

        cnt [lower_left] = 0;
        cnt [lower_right] = 0;
        cnt [upper_left] = 0;
        cnt [upper_right] = 0;

}

if ( argc > 1 ) {
        if ( ( fd = creat ( argv[1], 0666 ) ) == -1 ) {
                perror ( "output file cannot be created" );

                        exit ( 1 );
                }
                if ( write ( fd, result, sizeof ( result ) )
                     != sizeof ( result ) ) {
                        perror ( "write failed" );
                        exit ( 1 );
                }
        } else {
                for ( i = 0; i < 65536; i++ ) {
                        printf ( "%08x ", result[i] );
                        if ( ( ( i + 1 )/8 ) * 8 == ( i + 1 ) )
                                printf ( "\n" );
                }
        }

}

find_max ( )
{
        int     max;

        if ( lower_left > lower_right )
                max = lower_left;
        else
                max = lower_right;
        if ( upper_right > max )
                max = upper_right;
        if ( upper_left > max )
                max = upper_left;
        return max;

}

find_min ( )
{
        int     min;

        if ( lower_left < lower_right )
                min = lower_left;
        else
                min = lower_right;
        if ( upper_right < min )
                min = upper_right;
        if ( upper_left < min )
                min = upper_left;
        return min;
```

```
}

find_mode ( )
{
        register int    i;
        register int    max;

        max = 0;
        for ( i = 0; i < 16; i++ )
                if ( cnt[i] > max )
                        max = i;
        return max;
}

adj ( n )
int n;
{
        if ( n < 0 )
                return abs( n ) + 15;
        else
                return n;
}
RWL->
```

APPENDIX D

```
S 0 0 C 0 0 0 0 6 D 6 9 6 3 7 2 6 F 6 3 6 F 6 4 6 5 3 E
S2140000000202020202020202020202020202020202CB
S2140000100202020202020202020202020202020202BB
S2140000200202020202020202020202020202020202AB
S21400003002020202020202020202020202020202029B
S21400004002020202020202020202020202020202028B
S21400005002020202020202020202020202020202027B
S21400006002020202020202020202020202020202026B
S21400007002020202020202020202020202020202025B
S21400008002020202020202020202020202020202024B
S214000090020203030303040404040505050506061B
S2140000A00203030404050506060707080809090AEB
S2140000B0020304040506070708090A0A0B0C0D0DBF
S2140000C00203040506070809 0A0B0C0D0E0F101193
S2140000D002030506070 80A0B0C0D0F101112141563
S2140000E0020405070 80A0B0D0E1011131416171933
S2140000F002040607090B0D0E1012141517191B1C07
S2140001000202020202020202020202020202020202CA
S2140001100203030404050506060707080809090A7A
S21400012002030405060708090A0B0C0D0E0F101132
S2140001300204050708 0A0B0D0E10111314161719E2
S21400014002040608 0A0C0E10121416181A1C1E209A
S2140001500205070A0C0F111416191B1E202325284A
S2140001600205080B0E1114171A1D202326292C2F02
S2140001700206090D1014171B1E2225292C303337B2
S21400018002020202020202020202020202020202024A
S2140001900203040405060707080 90A0A0B0C0D0DDE
S2140001A00204050708 0A0B0D0E1011131416171972
S2140001B00204070 90B0D10121416191B1D1F22240A
S2140001C00205080B0E1114171A1D202326292C2FA2
S2140001D002060A0D1115191C2024282B2F33373A36
S2140001E002070B1014191D22262B2F34383D4146CA
S2140001F002070D12171C22272C31373C41464C5162
S2140002000202020202020202020202020202020202C9
S21400021002030405060708090A0B0C0D0E0F101141
```

S21400022002040608 0A0C0E10121416181A1C1E20B9
S2140002300205080B0E1114171A1D202326292C2F31
S2140002400206 0A0E12161A1E22262A2E32363A3EA9
S2140002500207 0C11161B20252A2F34393E43484D21
S2140002600208 0E141A20262C32383E444A50565C99
S21400027000209 10171E252C333A41484F565D646B11
S21400028000202020202020202020202020202020249
S21400029000203050607080A0B0C0D0F1011121415A1
S2140002A00205070A0C0F111416191B1E20232528F9
S2140002B002060A0D1115191C2024282B2F33373A55
S2140002C002070C11161B20252A2F34393E43484DB1
S2140002D002080F151B21282E343A41474D535A6009
S2140002E0020A111920282F373E464D555C646B7361
S2140002F0020B141C252E373F48515A626B747D85BD
S214000300002020202020202020202020202020202C8
S21400031002040507080A0B0D0E101113141617 1900
S2140003200205080B0E1114171A1D202326292C2F40
S21400033002070B1014191D22262B2F34383D414678
S21400034002080E141A20262C32383E444A50565CB8
S21400035 0020A111920282F373E464D555C646B73F0
S214000360020B141D262F38414A535C656E77808930
S214000370020D17222C37414C56616B76808B95A068
S2140003800020202020202020202020202020202020248
S21400039002040607090B0D0E1012141517191B1C64
S2140003A00206090D1014171B1E2225292C30333780
S2140003B002070D12171C22272C31373C41464C51A0
S2140003C0020910171E252C333A41484F565D646BC0
S2140003D0020B141C252E373F48515A626B747D85DC
S2140003E0020D17222C37414C56616B76808B95A0F8
S2140003F0020E1B27333F4C5864707D8995A1AEBA18
S214000400002020202020202020202020202020202C7
S21400041002040608 0A0C0E10121416181A1C1E20C7
S2140004200206 0A0E12161A1E22262A2E32363A3EC7
S2140004300208 0E141A20262C32383E444A50565CC7
S2140004400020A121A222A323A424A525A626A727AC7
S2140004500020C16202A343E48525C66707A848E98C7
S2140004600020E1A26323E4A56626E7A86929EAAB6C7
S21400047000 2101E2C3A48566472808E9CAAB8C6D4C7
S2140004800020202020202020202020202020202020247
S21400049002040607090B0D0E1012141517191B1C63
S2140004A00206090D1014171B1E2225292C3033377F
S2140004B002070D12171C22272C31373C41464C519F
S2140004C0020910171E252C333A41484F565D646BBF
S2140004D0020B141C252E373F48515A626B747D85DB
S2140004E0020D17222C37414C56616B76808B95A0F7
S2140004F0020E1B27333F4C5864707D8995A1AEBA17
S214000500002020202020202020202020202020202C6
S21400051002040507080A0B0D0E101113141617 19FE
S2140005200205080B0E1114171A1D202326292C2F3E
S21400053002070B1014191D22262B2F34383D414676
S21400054002080E141A20262C32383E444A50565CB6
S21400055 0020A111920282F373E464D555C646B73EE
S214000560020B141D262F38414A535C656E7780892E
S214000570020D17222C37414C56616B76808B95A066
S2140005800020202020202020202020202020202020246
S21400059000203050607080A0B0C0D0F101112141 59E
S2140005A00205070A0C0F111416191B1E20232528F6
S2140005B002060A0D1115191C2024282B2F33373A52
S2140005C002070C11161B20252A2F34393E43484DAE
S2140005D002080F151B21282E343A41474D535A6006
S2140005E0020A111920282F373E464D555C646B735E
S2140005F0020B141C252E373F48515A626B747D85BA
S214000600002020202020202020202020202020202C5

```
S21400061002030405060708090A0B0C0D0E0F10113D
S214000620020406080A0C0E10121416181A1C1E20B5
S2140006300205080B0E1114171A1D202326292C2F2D
S214000640020A111620282F373E464D555C646B7339
```

```
S21400061002030405060708090A0B0C0D0E0F10113D
S214000620020406080A0C0E10121416181A1C1E20B5
S2140006300205080B0E1114171A1D202326292C2F2D
S21400064002060A0E12161A1E22262A2E32363A3EA5
S21400065002070C11161B20252A2F34393E43484D1D
S21400066002080E141A20262C32383E444A50565C95
S214000670020910171E252C333A41484F565D646B0D
S21400068002020202020202020202020202020202045
S2140006900203040506070708090A0A0B0C0D0DD9
S2140006A002040507080A0B0D0E101113141617196D
S2140006B00204070B0D10121416191B1D1F222405
S2140006C00205080B0E1114171A1D202326292C2F9D
S214000A4002060A0E12161A1E22262A2E32363A3EA1
S214000A500205080B0E1114171A1D202326292C2F09
S214000A60020406080A0C0E10121416181A1C1E2071
S214000A7002030405060708090A0B0C0D0E0F1011D9
S214000A80020C16202A343E48525C66707A848E9891
S214000A90020B141C252E373F48515A626B747D8515
S214000AA0020A111920282F373E464D555C646B7399
S214000AB002080F151B21282E343A41474D535A6021
S214000AC002070C11161B20252A2F34393E43484DA9
S214000AD002060A0D1115191C2024282B2F33373A2D
S214000AE00205070A0C0F111416191B1E20232528B1
S214000AF00203050607080A0B0C0D0F101112141539
S214000B00020E1A26323E4A56626E7A86929EAAB620
S214000B10020D17222C37414C56616B76808B95A0C0
S214000B20020B141D262F38414A535C656E77808968
S214000B30020A111920282F373E464D555C646B7308
S214000B4002080E141A20262C32383E444A50565CB0
S214000B5002070B1014191D22262B2F34383D414650
S214000B600205080B0E1114171A1D202326292C2FF8
S214000B7002040507080A0B0D0E1011131416171998
S214000B8002101E2C3A48566472808E9CAAB8C6D4B0
S214000B90020E1B27333F4C5864707D8995A1AEBA70
S214000BA0020D17222C37414C56616B76808B95A030
S214000BB0020B141C252E373F48515A626B747D85F4
S214000BC0020910171E252C333A41484F565D646BB8
S214000BD002070D12171C22272C31373C41464C5178
S214000BE00206090D1014171B1E2225292C30333738
S214000BF002040607090B0D0E1012141517191B1CFC
S214000C00021222324252627282929A2B2C2D2E2F23F
S214000C1002101E2C3A48566472808E9CAAB8C6D41F
S214000C20020E1A26323E4A56626E7A86929EAAB6FF
S214000C30020C16202A343E48525C66707A848E98DF
S214000C40020A121A222A323A424A525A626A727ABF
S214000C5002080E141A20262C32383E444A50565C9F
S214000C6002060A0E12161A1E22262A2E32363A3E7F
S214000C70020406080A0C0E10121416181A1C1E205F
S214000C8002101E2C3A48566472808E9CAAB8C6D4AF
S214000C90020E1B27333F4C5864707D8995A1AEBA6F
S214000CA0020D17222C37414C56616B76808B95A02F
S214000CB0020B141C252E373F48515A626B747D85F3
S214000CC0020910171E252C333A41484F565D646BB7
S214000CD002070D12171C22272C31373C41464C5177
S214000CE00206090D1014171B1E2225292C30333737
S214000CF002040607090B0D0E1012141517191B1CFB
S214000D00020E1A26323E4A56626E7A86929EAAB61E
S214000D10020D17222C37414C56616B76808B95A0BE
S214000D20020B141D262F38414A535C656E77808966
S214000D30020A111920282F373E464D555C646B7306
S214000D4002080E141A20262C32383E444A50565CAE
S214000D5002070B1014191D22262B2F34383D41464E
S214000D600205080B0E1114171A1D202326292C2FF6
```

S214000D7002040507080A0B0D0E1011131416171996
S214000D80020C16202A343E48525C66707A848E988E
S214000D90020B141C252E373F48515A626B747D8512
S214000DA0020A111920282F373E464D555C646B7396
S2140006D002060A0D1115191C2024282B2F33373A31
S2140006E002070B1014191D22262B2F34383D4146C5
S2140006F002070D12171C22272C31373C41464C515D
S21400070002020202020202020202020202020202C4
S2140007100203030404050506060707080809090A74
S2140007200203040506070809 0A0B0C0D0E0F10112C
S214000730020405070 80A0B0D0E1011131416171 9DC
S2140007400204060 80A0C0E10121416181A1C1E2094
S2140007500205070A0C0F111416191B1E2023252844
S2140007600205080B0E1114171A1D202326292C2FFC
S2140007700206090D1014171B1E2225292C303337AC
S21400078002020202020202020202020202020244
S21400079002020303030304040404050505050606 14
S2140007A002030304040505060607070808090 90AE4
S2140007B002030404050607070809 0A0A0B0C0D0DB8
S2140007C0020304050607080 90A0B0C0D0E0F10118C
S2140007D0020305060708 0A0B0C0D0F101112141 55C
S2140007E002040507080A0B0D0E101113141617192C
S2140007F002040607090B0D0E1012141517191B1C00
S2140008000202020202020202020202020202020202C3
S21400081002020202020202020202020202020202B3
S21400082002020202020202020202020202020202A3
S214000830020202020202020202020202020202020293
S214000840020202020202020202020202020202020283
S214000850020202020202020202020202020202020273
S214000860020202020202020202020202020202020263
S214000870020202020202020202020202020202020253
S2140008800204060 80A0C0E10121416181A1C1E2053
S214000890020406070 90B0D0E1012141517191B1C5F
S2140008A002040507080A0B0D0E101113141617196B
S2140008B002030506070 80A0B0C0D0F10111214157B
S2140008C0020304050607080 90A0B0C0D0E0F10118B
S2140008D002030404050607070809 0A0A0B0C0D0D97
S2140008E00203030404050506060707080809090AA3
S2140008F00202030303030404040405050505 0606B3
S21400090002060A0E12161A1E22262A2E32363A3EE2
S2140009100206090D1014171B1E2225292C3033370A
S2140009200205080B0E1114171A1D202326292C2F3A
S2140009300205070A0C0F111416191B1E2023252862
S21400094002040608 0A0C0E10121416181A1C1E2092
S21400095002040507080A0B0D0E10111314161719BA
S21400096002030405060708090A0B0C0D0E0F1011EA
S2140009700203030404050506060707080809090A12
S21400098002080E141A20262C32383E444A50565C72
S21400099002070D12171C22272C31373C41464C51BA
S2140009A002070B1014191D22262B2F34383D414602
S2140009B002060A0D1115191C2024282B2F33373A4E
S2140009C00205080B0E1114171A1D202326292C2F9A
S2140009D002040709 0B0D10121416191B1D1F2224E2
S2140009E002040507080A0B0D0E101113141617192A
S2140009F002030404050607070809 0A0A0B0C0D0D76
S214000A00020A121A222A323A424A525A626A727A01
S214000A10020910171E252C333A41484F565D646B69
S214000A2002080E141A20262C32383E444A50565CD1
S214000A3002070C11161B20252A2F34393E43484D39
S214000DB002080F151B21282E343A41474D535A601E
S214000DC002070C11161B20252A2F34393E43484DA6
S214000DD002060A0D1115191C2024282B2F33373A2A
S214000DE00205070A0C0F111416191B1E20232528AE

S214000DF00203050607080A0B0C0D0F101112141536
S214000E00020A121A222A323A424A525A626A727AFD
S214000E10020910171E252C333A41484F565D646B65
S214000E2002080E141A20262C32383E444A50565CCD
S214000E3002070C11161B20252A2F34393E43484D35
S214000E4002060A0E12161A1E22262A2E32363A3E9D
S214000E500205080B0E1114171A1D20232629 2C2F05
S214000E60020406080A0C0E10121416181A1C1E206D
S214000E700203040506070809 0A0B0C0D0E0F1011D5
S214000E8002080E141A20262C32383E444A50565C6D
S214000E9002070D12171C22272C31373C41464C51B5
S214000EA002070B1014191D22262B2F34383D4146FD
S214000EB002060A0D1115191C2024282B2F33373A49
S214000EC00205080B0E1114171A1D202326292C2F95
S214000ED0020407090B0D10121416191B1D1F2224DD
S214000EE0020405070 80A0B0D0E1011131416171925
S214000EF002030404050607070809 0A0A0B0C0D0D71
S214000F0002060A0E12161A1E22262A2E32363A3EDC
S214000F100206090D1014171B1E2225292C30333704
S214000F200205080B0E1114171A1D202326292C2F34
S214000F3002050 70A0C0F111416191B1E202325285C
S214000F40020406080A0C0E10121416181A1C1E208C
S214000F5002040507080A0B0D0E101113141617 19B4
S214000F60020304050607080 90A0B0C0D0E0F1011E4
S214000F7002030304040505060607070808090 90A0C
S214000F80020406080A0C0E10121416181A1C1E204C
S214000F9002040607090B0D0E101214151719 1B1C58
S214000FA0020405070 80A0B0D0E1011131416171964
S214000FB00203050607080A0B0C0D0F101112141574
S214000FC0020304050607080 90A0B0C0D0E0F101184
S214000FD002030404050607070809 0A0A0B0C0D0D90
S214000FE00203030404050506060707080809090A9C
S214000FF00202020303030304040404050505050606AC
S804000000FB

What is claimed is:

1. A method for storing gray scale image data for a defined image having a plurality of individual pixels each having one of a plurality of discrete gray scale values comprising:

(a) dividing said defined image into discrete first blocks of 8×8 pixels each;
(b) identifying each of said blocks for which every pixel in said block has an equivalent gray scale value;
(c) for each said block identified in step (b), storing a selected code representative of said pixels in said block having equivalent grey scale values and of said gray scale value;
(d) for each block not identified, storing a second code representative of said pixels in said block not having equivalent gray scale values and subdividing said block into smaller blocks;
(e) repeating said steps (b), (c) and (d) until only 1×2 pixel blocks remain, each pixel having a different gray scale value;
(f) then storing said second code and a third code representative of a gray scale value for a first pixel and the difference between the gray scale value of said first pixel and a gray scale value for a second pixel.

2. A method for digital image processing, including compressed storage of image data:

(a) developing digital data for an image comprised of an array of pixels each having gray scale value;
(b) defining a plurality of subportions of said image, each having a selected number of pixels;
(c) storing a first code indicating whether all gray scale values in a said sub-portion are equivalent;
(d) storing a second code with said first code; representing the equivalent gray scale value if said first code indicates that all gray scale values in said sub-portion are equivalent;
(e) subdividing said sub-portions into second sets of pixels if said first code indicates that all gray scale values in said sub-portion are not equivalent;
(f) repeating steps (c), (d) and (e) until all sets of pixels having a first code indicating non-equivalency have been finally subdivided to a selected minimum number of pixels; then
(g) storing a third code representative of a gray scale value of a first pixel in said finally subdivided set; and
(h) storing a fourth code representative of the difference between the gray scale value for said first pixel and that for subsequent pixels;
(i) repeating steps (c)-(h) for each of said subportions.

3. A method for storing an image comprised of multiple pixels each having a discrete gray scale value comprising:

dividing said image into a plurality of 8 pixel by 8 pixel blocks;
storing a first code indicative of whether all pixels in a first of said blocks have an equivalent gray scale value;

storing a second code representative of said equivalent gray scale value when said first code indicates equivalency;

subdividing said first block into four 4 pixel×4 pixel sub-blocks when said first code does not indicate equivalency;

storing a first code for each one of said sub-blocks indicate of whether all pixels in said each sub-block have an equivalent gray scale value;

storing a second code representative of said equivalent gray scale value for said each sub-block when said first code for said each sub-block indicates equivalency;

further subdividing each of said sub-blocks into four 2 pixels by 2 pixels sub-sub-blocks where said first code for said each sub-blocks does not indicate equivalency;

storing a first code for each one of said sub-sub-blocks indicative of whether all pixels in said each sub-sub-block have an equivalent gray scale value;

storing a second code representative of said equivalent gray scale value for said each sub-sub-block when said first code for said sub-sub-block indicates equivalency;

further subdividing each of said sub-sub-blocks into two 1 pixel by 2 base blocks when said first code for said sub-sub-block does not indicate equivalency;

storing a first code for said each one of said base blocks indicative of whether both pixels in said base block have an equivalent value;

storing a second code representative of the gray scale value of a first of said two pixels in said base block when said first code does not indicate equivalency;

storing a third code representative of the difference between the gray scale value for said first pixel and the gray scale value for a second pixel in said base block when said first code for said base block does not indicate equivalency.

4. A system for compressing gray scale image data for storage comprising:

first memory means for temporarily storing a selected portion of said gray scale image data;

second memory means for temporarily storing information indicative of blocks of said selected portion of said image data having a constant gray scale value;

processor means responsive to the information stored in said second memory means for selectively addressing said first memory means and for storing a code representative of said stored gray scale image data, said code identifying said constant gray scale value and the size of the block;

third memory means for temporarily storing a second selection portion of said gray scale image data while said processor means selectively addresses said first means; and fourth memory means for temporarily storing information indicative of blocks of said second selected portion of said image data having a constant gray scale value.

5. The system of claim 4 further including:

lookup table means interposed between said processor means and said first memory means and adapted to receive as input the content of selected addresses within said first memory means in response to said selective addressing by said processor means and to provide as output to said processor means said code representative of said stored gray scale image data for each block indicated by said stored information in said second memory means.

6. The system of claim 4 wherein said second memory means comprises:

a first section of memory for temporarily storing information for each 8 pixel by 8 pixel block in said stored image indicative of whether all pixels in said 8 pixel by 8 pixel block have the same gray scale value; and a second section of memory for temporarily storing information for each 4 pixel by 4 pixel block in said stored image indicate of whether all pixels in said 4 pixel by 4 pixel block have the same gray scale value.

7. The system of claim 4 further including:

multiplexer means responsive to said processor means to electronically couple said processor means alternately to said first and second memory means and to said third and fourth memory means for selective addressing.

8. The system of claim 4 further including:

logic means responsive to said gray scale image data for outputting information indicative of blocks of said image data having a constant gray scale value.

9. The system of claim 8 further including:

multiplexer means responsive to said processor means to couple said processor means alternatively to said first and second memory means and to said third and fourth memory means for said selective addressing and to alternately couple said logic means to said second memory means and said fourth memory means.

10. A system for storing gray scale image data for one or more selected images in a compressed format comprising:

first buffer means for storing a portion of said gray scale image data having a first memory means for storing said a portion of said gray scale image data and a second memory means for storing information representing blocks of said a portion of said image data having a same gray scale value;

second buffer means for storing another portion of said gray scale image data having a third memory means for storing said another portion of said gray scale image data and a fourth memory means for storing information representing blocks of said another portion of said image data having a same gray scale value;

lookup table means for providing an output code indicative of stored gray scale image data;

processor means for selectively addressing said first and second buffer means to provide input to said lookup table means and for providing said output code for storage.

11. The system of claim 10 further including:

input means for receiving said gray scale image data for said selected image; and multiplexer means for alternatively coupling said processor means to said first buffer means and to said second buffer means and for alternately coupling said input means to said first buffer means and to said second buffer means, whereby said processor means may selectively address said a portion of said gray scale image data stored in said first buffer while said another portion of said gray scale image data is stored in said second buffer means.

12. The system of claim 11 wherein:

said first buffer means further comprises a first memory means for storing said a portion of said gray scale image data and a second memory means for storing information representing blocks of said a portion of said image data having a same gray scale value; and said second buffer means further comprises a third memory means for storing said another portion of said gray scale image data and a fourth memory means for storing information representing blocks of said another portion of said image data having a same gray scale value.

13. The system of claim 12 wherein said input means comprises:

direct access means for receiving said gray scale image data and providing said data unprocessed as an output; and logic means for receiving said gray scale image data and providing output information representative of blocks of said data having a same gray scale value.

14. The system of claim 13 wherein said multiplexer means couples said direct access means alternately to said first memory means and said third memory means and coupled said logic means alternately to said second memory means and to said fourth memory means.

15. The system of claim 14 wherein said logic means comprises:

a first value-same circuit for providing output information indicative of a first size block of said data having a same gray scale value;

a second value-same circuit for providing output information indicative of a second size block of said data having a same gray scale value; and control means responsive to an address signal associated with said image data for controlling operation of said first and second value-same circuits.

16. The system of claim 15 wherein:

said second memory means comprises a first section for storing said information indicative of said first size block having a same gray scale value and a second section for storing said information indicative of said second size block having a same gray scale value; and said fourth memory means comprises a first section for storing said information indicative of said first size block having a same gray scale value and a second section for storing said information indicative of said second size block having a same gray scale value.

17. The system of claim 12 wherein the information stored in said second memory means controls said selective addressing by said processor means of said first memory means.

18. The system of claim 17 wherein the information stored in said fourth memory means controls said selective addressing by said processor means of said third memory means.

19. The system of claim 12 wherein the information stored in said fourth memory means controls said selective addressing by said processor means of said third memory means.

20. The system of claim 10 wherein the information stored in said second memory means controls said selective addressing by said processor means of said first memory means.

21. The system of claim 20 wherein the information stored in said fourth memory means controls said selective addressing by said processor means of said third memory means.

22. The system of claim 10 wherein the information stored in said fourth memory means controls said selective addressing by said processor means of said third memory means.

* * * * *